(12) United States Patent
Xin et al.

(10) Patent No.: US 12,224,905 B2
(45) Date of Patent: *Feb. 11, 2025

(54) COMMUNICATION METHOD AND COMMUNICATION APPARATUS

(71) Applicant: HUAWEI TECHNOLOGIES CO., LTD., Guangdong (CN)

(72) Inventors: Yang Xin, Shanghai (CN); Fangyuan Zhu, Beijing (CN); Weiwei Chong, Shenzhen (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,395

(22) Filed: Nov. 28, 2023

(65) Prior Publication Data

US 2024/0171465 A1 May 23, 2024

Related U.S. Application Data

(63) Continuation of application No. 18/167,347, filed on Feb. 10, 2023, now Pat. No. 11,855,846, which is a
(Continued)

(30) Foreign Application Priority Data

Aug. 12, 2020 (CN) .......................... 202010817054.2

(51) Int. Cl.
*H04L 41/0893* (2022.01)
*G06F 18/20* (2023.01)
(Continued)

(52) U.S. Cl.
CPC .......... *H04L 41/0893* (2013.01); *G06F 18/20* (2023.01); *H04L 41/14* (2013.01); *H04L 63/0236* (2013.01)

(58) Field of Classification Search
None
See application file for complete search history.

(56) References Cited

U.S. PATENT DOCUMENTS 8,200,790 B1 * 6/2012 Reeves .................... G06F 8/60
  709/220
9,794,233 B2 * 10/2017 Grab ...................... H04L 63/168
(Continued)

FOREIGN PATENT DOCUMENTS

| CN | 103051725 A | 4/2013 |
|---|---|---|
| CN | 105426425 A | 3/2016 |

(Continued)

OTHER PUBLICATIONS

3GPP TS 23.501 V16.5.1, "3rd Generation Partnership Project; Technical Specification Group Services and System Aspects; System architecture for the 5G System (5GS); Stage 2 (Release 16)," Aug. 2020, 440 pages.
(Continued)

*Primary Examiner* — Quang N Nguyen
(74) *Attorney, Agent, or Firm* — Fish & Richardson P.C.

(57) ABSTRACT

Embodiments of this application disclose a communication method and a communication apparatus, to identify application information of first data, and improve an application analytics success rate. The method includes: A first data analytics network element receives first information of an application from a first network element, where the first information includes first application description information and/or an application status that correspond/corresponds to the application, the first application description information includes an application identifier and first IP information that correspond to the application, and the application status includes a foreground state or a background state of the application; the first data analytics network element determines second information based on
(Continued)

the first information; and the first data analytics network element sends the second information to a second network element.

20 Claims, 10 Drawing Sheets

Related U.S. Application Data continuation of application No. PCT/CN2021/096242, filed on May 27, 2021.

(51) Int. Cl.
 *H04L 9/40* (2022.01)
 *H04L 41/14* (2022.01)

(56) References Cited

U.S. PATENT DOCUMENTS

| | | | |
|---|---|---|---|
| 11,190,497 B2* | 11/2021 | Grab | G06F 21/12 |
| 11,526,325 B2* | 12/2022 | Stankoulov | G06F 3/0488 |
| 11,888,708 B1* | 1/2024 | Madiya | H04L 41/0816 |
| 2005/0188318 A1* | 8/2005 | Tamir | G06F 11/3438 |
| | | | 715/744 |
| 2013/0054960 A1* | 2/2013 | Grab | H04L 63/0884 |
| | | | 726/17 |
| 2014/0233421 A1 | 8/2014 | Matthews | |
| 2018/0139645 A1 | 5/2018 | Yu et al. | |
| 2019/0174319 A1 | 6/2019 | Backholm et al. | |
| 2021/0208906 A1 | 7/2021 | Hands et al. | |
| 2024/0137269 A1* | 4/2024 | Yao | H04L 41/0806 |

FOREIGN PATENT DOCUMENTS

| | | |
|---|---|---|
| CN | 105591973 A | 5/2016 |
| CN | 109698798 A | 4/2019 |
| CN | 110580256 A | 12/2019 |
| EP | 1742416 A1 | 1/2007 |
| WO | 2012048744 A1 | 4/2012 |

OTHER PUBLICATIONS

3GPP TS 23.288 V16.4.0, "3rd Generation Partnership Project; Technical Specification Group Services and System Aspects; Architecture enhancements for 5G System (5GS) to support network data analytics services (Release 16)," Jul. 2020, 66 pages.

3GPP TS 23.502 V16.5.1, "3rd Generation Partnership Project; Technical Specification Group Services and System Aspects; Procedures for the 5G System (5GS); Stage 2 (Release 16)," Aug. 2020, 594 pages.

3GPP TS 23.503 V16.5.1, "3rd Generation Partnership Project; Technical Specification Group Services and System Aspects; Policy and charging control framework for the 5G System (5GS); Stage 2 (Release 16)," Aug. 2020, 118 pages.

CATT, "KI #1, New Sol: NWDAF decomposition," SA WG2 Meeting #S2-139E, S2-2004181, Jun. 1-12, 2020, Elbonia, 3 pages.

International Search Report and Written Opinion in International Appln. No. PCT/CN2021/096242, mailed on Aug. 20, 2021, 18 pages (with English translation).

Samsung, "KI #14, New Sol: new application detection," SA WG2 Meeting #139E, S2-2004183, Jun. 1-12, 2020, 4 pages.

Samsung, "KI #14, New Sol: new application detection," SA WG2 Meeting #139E, S2-2004559, Jun. 1-12, 2020, 4 pages.

Samsung, "Solution to support slice SLA guarantee," 3GPP SA WG2 Meeting #136, S2-1911816, Reno, NV, USA, Nov. 18-22, 2019, 3 pages.

Sandvine, "New key issue: Adding Application KPIs to the Input data in some services described in TS23.288," SA WG2 Meeting #135, S2-1909917, Split, Croatia, Oct. 14-18, 2019, 3 pages.

* cited by examiner

COMMUNICATION METHOD AND COMMUNICATION APPARATUS

CROSS-REFERENCE TO RELATED APPLICATIONS

This application is a continuation of U.S. patent application Ser. No. 18/167,347, filed on Feb. 10, 2023, now U.S. Pat. No. 11,855,846, issued on Dec. 26, 2023, which is a continuation of International Application No. PCT/CN2021/096242, filed on May 27, 2021. The International Application claims priority to Chinese Patent Application No. 202010817054.2, filed on Aug. 12, 2020. All of the aforementioned patent applications are hereby incorporated by reference in their entireties.

TECHNICAL FIELD

This application relates to the field of data processing technologies, and in particular, to a communication method and a communication apparatus.

BACKGROUND

As a capability of an operator network, application analytics can assist an operator in performing differentiated processing on different service flows. For example, the differentiated processing that may be performed includes quality of service (QOS) assurance, slice (or network element) load balancing, and air interface resource scheduling.

Currently, there is a service method based on packet flow description (PFD) information. A user plane function (UPF) network element needs to obtain PFD information provided by an application function (AF) network element, and the UPF network element performs application analytics based on the PFD information provided by the AF network element. However, in an actual data flow transmission scenario, the AF network element cannot provide updated (added, deleted, overwritten, or the like) PFD information to the UPF network element in real time or quickly. As a result, the UPF network element cannot detect a new data flow, and application analytics cannot be performed.

SUMMARY

Embodiments of this application provide an application analytics method and a communication apparatus, to identify application information of first data and improve an application analytics success rate.

To resolve the foregoing technical problem, embodiments of this application provide the following technical solutions.

According to a first aspect, an embodiment of this application provides an application analytics method, including: A first data analytics network element receives first information of an application from a first network element, where the first information includes first application description information and/or an application status that correspond/corresponds to the application, the first application description information includes an application identifier and first internet protocol IP information that correspond to the application, and the application status includes a foreground state or a background state of the application; the first data analytics network element determines second information based on the first information, where the second information includes the application identifier and at least one of the following: an application analytics model, at least one application characteristic, and second application description information; and the first data analytics network element sends the second information to a second network element, where the second information is used by the second network element to identify application information corresponding to first data, and the application information corresponding to the first data includes an application identifier and/or an application status of the first data.

In the foregoing solution, the first data analytics network element may determine at least one of the following: the application analytics model, the at least one application characteristic, and the second application description information. The second information is sent to the second network element, so that the second network element may receive at least one of the following: the application analytics model, the at least one application characteristic, and the second application description information. Therefore, the second network element may identify the first data by using the second information. In this embodiment of this application, the second network element may identify the first data by using the application identifier and at least one of the following: the application analytics model, the at least one application characteristic, and the second application description information, so as to identify the application information of the first data, and improve an application analytics success rate.

In a possible implementation, the method further includes: The first data analytics network element receives second data corresponding to the application from a third network element; and that the first data analytics network element determines second information based on the first information includes: The first data analytics network element determines the second information based on the first information and the second data. In the foregoing solution, the first data analytics network element receives the first information from the first network element, and receives the second data from the third network element. In this case, the first data analytics network element may determine the second information based on the first information and the second data together, so that the first data analytics network element may send the second information to the second network element, and the second network element performs application analytics on the first data by using the second information.

In a possible implementation, the second information includes the application analytics model, and the first data analytics network element is used to determine the application information corresponding to the data; and that the first data analytics network element determines the second information based on the first information and the second data includes: The first data analytics network element performs model training based on the first information and the second data, to obtain the application analytics model. In the foregoing solution, the second data may be training data of an original model, the application analytics model is a model for identifying the application information corresponding to the data, and training of the application analytics model has a plurality of implementations. For example, a supervised machine learning algorithm is used in a process of training the application analytics model, and the first data analytics network element may output the application analytics model after completing the model training.

In a possible implementation, the second information includes the at least one application characteristic, and the at least one application characteristic corresponds to the application information of the first data; and that the first data analytics network element determines the second information based on the first information and the second data includes: The first data analytics network element performs application characteristic extraction on the second data based on the first information, to obtain the at least one application characteristic corresponding to the application information, where different application information corresponds to different application characteristics. In the foregoing solution, at least one type of application information corresponds to at least one application characteristic, and different application information corresponds to different application characteristics. Therefore, the first data analytics network element sends the at least one application characteristic corresponding to the at least one type of application information to the second network element, so that the second network element may perform application analytics on the first data by using the application characteristic.

In a possible implementation, the second information includes the second application description information, and the second application description information includes second IP information; and that the first data analytics network element determines the second information based on the first information and the second data includes: The first data analytics network element determines the application analytics model or the at least one application characteristic based on the first information and the second data; and the first data analytics network element determines the second application description information based on the application analytics model or the at least one application characteristic. In the foregoing solution, after determining the application analytics model or the at least one application characteristic, the first data analytics network element may determine the second application description information based on the application analytics model or the at least one application characteristic. Therefore, the first data analytics network element sends the second application description information to the second network element, so that the second network element may perform application analytics on the first data by using the second application description information.

In a possible implementation, the second information includes the second application description information, and the second application description information includes second IP information; and that the first data analytics network element determines the second information based on the first information and the second data includes: The first data analytics network element determines the application analytics model or the at least one application characteristic based on the first information and the second data; the first data analytics network element determines, based on the application analytics model or the at least one application characteristic, application information corresponding to third data, where the application information corresponding to the third data includes an application identifier and/or third IP information of the third data; and the first data analytics network element determines the second application description information based on the application identifier and/or the third IP information of the third data. The third data is used to determine the application identifier and/or the third IP information. For example, the third data may be data used for initial inference, and the application information corresponding to the third data may be obtained by using the application analytics model or the at least one application characteristic.

In the foregoing solution, after determining the application analytics model or the at least one application characteristic, the first data analytics network element may determine, based on the application analytics model or the at least one application characteristic, the application information corresponding to the third data. For example, the application information corresponding to the third data includes the application identifier and/or the third IP information of the third data, where the third IP information may be determined based on IP 5-tuple information (including the third IP information) of the third data. The first data analytics network element may determine the second application description information by using the application identifier and/or the third IP information of the third data, where the second IP information in the second application description information may be the third IP information corresponding to the third data. Therefore, the first data analytics network element sends the second application description information to the second network element, so that the second network element may perform application analytics on the first data by using the second application description information.

In a possible implementation, the method further includes: The first data analytics network element determines that the first IP information of the application is updated to the second IP information; and the first data analytics network element sends first indication information to the second network element, where the first indication information indicates that the second IP information is updated IP information of the first IP information. In the foregoing solution, the first data analytics network element may update the first IP information corresponding to the application to the second IP information, and send the first indication information, so that the second network element may determine, by using the first indication information, that the application corresponds to the second IP information, and the second network element may perform application analytics on the first data by using the second IP information.

In a possible implementation, the method further includes: The first data analytics network element determines that the second IP information is newly added IP information of the application; and the first data analytics network element sends second indication information to the second network element, where the second indication information indicates that the second IP information is the newly added IP information of the application. In the foregoing solution, the first data analytics network element may keep the first IP information corresponding to the application unchanged, add the second IP information corresponding to the application, and send the second indication information, so that the second network element may determine, by using the second indication information, that the application corresponds to the second IP information, and the second network element may perform application analytics on the first data by using the second IP information.

In a possible implementation, the first data analytics network element includes a network data analytics function NWDAF network element; the first network element includes a first network exposure function NEF network element; and the second network element includes at least one of the following: a first user plane function UPF network element, a second data analytics network element, and a second NEF network element.

In a possible implementation, the third network element includes a second UPF network element, a session management function SMF network element, an access and mobility management function AMF network element, and an application function AF network element.

In a possible implementation, the application description information includes packet flow description PFD information.

In a possible implementation, the application analytics model is used to determine the application information corresponding to the data; the at least one application characteristic corresponds to the application information of the first data; and/or the IP information is IP 3-tuple information or 5-tuple information.

According to a second aspect, an embodiment of this application further provides an application analytics method, including: A second network element receives second information from a first data analytics network element, where the second information includes an application identifier of an application and at least one of the following: an application analytics model, at least one application characteristic, and second application description information; and the second network element determines, based on the second information, application information corresponding to first data, where the application information corresponding to the first data includes an application identifier and/or an application status of the first data, and the application status includes a foreground state or a background state of the application. In some embodiments of this application, because the second network element may receive at least one of the following: the application analytics model, the at least one application characteristic, and the second application description information, the second network element may identify the first data by using the second information. In this embodiment of this application, the second network element may identify the first data by using the application identifier and at least one of the following: the application analytics model, the at least one application characteristic, and the second application description information, so as to identify the application information of the first data, and improve an application analytics success rate.

In a possible implementation, the second information includes the application analytics model, and the application analytics model is used to determine the application information corresponding to the data; and that the second network element determines, based on the second information, application information corresponding to first data includes: The second network element obtains a first characteristic parameter from the first data; and the second network element inputs the first characteristic parameter into the application analytics model, and outputs the application information corresponding to the first data through the application analytics model. In the foregoing solution, the second network element may obtain the application analytics model from the first data analytics network element, the second network element obtains the first characteristic parameter from the first data, and then the second network element inputs the first characteristic parameter into the application analytics model. Because the application analytics model is used to determine the application information corresponding to the data, the application information corresponding to the first data may be output through the application analytics model, and the second network element may implement application analytics on the first data by using the application analytics model.

In a possible implementation, the second information includes the at least one application characteristic, and the at least one application characteristic corresponds to the application information of the first data; and that the second network element determines, based on the second information, application information corresponding to first data includes: The second network element obtains a second characteristic parameter from the first data; and the second network element matches the second characteristic parameter with the at least one application characteristic, to obtain an application characteristic that successfully matches the second characteristic parameter, where application information corresponding to the application characteristic that successfully matches the second characteristic parameter is the application information corresponding to the first data. In the foregoing solution, the second network element may obtain the at least one application characteristic from the first data analytics network element, the second network element obtains the second characteristic parameter from the first data, and the second network element matches the second characteristic parameter with the at least one application characteristic. Because application characteristics of different applications are different, the at least one application characteristic corresponds to the application information of the first data. The application characteristic that successfully matches the second characteristic parameter may be obtained through characteristic matching, and the application information corresponding to the application characteristic that successfully matches the second characteristic parameter is the application information corresponding to the first data. The second network element may implement application analytics on the first data by using the at least one application characteristic.

In a possible implementation, the second information includes the second application description information, and the second application description information includes second IP information; and that the second network element determines, based on the second information, application information corresponding to first data includes: The second network element determines IP information of the first data; and the second network element determines, based on the IP information of the first data and the second IP information corresponding to the application, the application information corresponding to the first data. In the foregoing solution, the second network element may obtain, from the first data analytics network element, the second IP information included in the second application description information. The second network element determines the IP information of the first data, and performs analytics by using the IP information of the first data and the second IP information corresponding to the application. When the IP information of the first data is the same as the second IP information corresponding to the application, the second network element may determine that application information corresponding to the second IP information is the application information corresponding to the first data. The second network element may implement application analytics on the first data by using the second application description information.

In a possible implementation, before that a second network element receives second information from a first data analytics network element, the method further includes: When the second network element includes a second data analytics network element, the second network element generates filtering information based on a preset data analytics filtering condition, and sends the filtering information to the first data analytics network element, where the filtering information requests the second information; when the second network element includes a first user plane function UPF network element, the second network element filters second data based on a preset event filtering condition, and sends filtered second data to the first data analytics network element, where the filtered second data is used by the first data analytics network element to determine the second information; or when the second network element includes a second network exposure function NEF network element, the second network element sends first application description information to the first data analytics network element, where the first application description information includes an application identifier and first IP information that correspond to the application, and the first application description information is used by the first data analytics network element to determine the second information. In the foregoing solution, the second network element generates the filtering information based on the data analytics filtering condition, and sends the filtering information to the first data analytics network element. The first data analytics network element may perform data filtering by using the data analytics filtering condition, to filter out data that satisfies the data analytics filtering condition. Then, the first data analytics network element may send the second information to the second data analytics network element based on the filtering information. In this embodiment of this application, the filtering information indicates the first data analytics network element to perform data filtering, and may further request the first data analytics network element to send the second information, so that the second data analytics network element may receive the second information. When the second network element includes the first user plane function UPF network element, the second network element obtains the preset event filtering condition, filters the second data by using the event filtering condition, and sends the filtered second data to the first data analytics network element, so that the first data analytics network element can determine the second information by using the filtered second data, and second information generation efficiency is improved.

In a possible implementation, the second network element includes the second NEF network element, and the method further includes: The second network element receives first indication information from the first data analytics network element; and the second network element determines, based on the first indication information, that the second IP information included in the second application description information is updated IP information of the first IP information. In the foregoing solution, the first data analytics network element may update the first IP information corresponding to the application to the second IP information, and send the first indication information, so that the second network element may determine, by using the first indication information, that the application corresponds to the second IP information, and the second network element may perform application analytics on the first data by using the second IP information.

In a possible implementation, the second network element includes the second NEF network element, and the method further includes: The second network element receives second indication information from the first data analytics network element; and the second network element determines, based on the second indication information, that the second IP information included in the second application description information is newly added IP information of the application. In the foregoing solution, the first data analytics network element may keep the first IP information corresponding to the application unchanged, add the second IP information corresponding to the application, and send the second indication information, so that the second network element may determine, by using the second indication information, that the application corresponds to the second IP information, and the second network element may perform application analytics on the first data by using the second IP information.

In a possible implementation, the application information corresponding to the first data includes the application identifier of the first data, and the method further includes: The second network element obtains policy information of the first data based on the application identifier of the first data. In the foregoing solution, the first data analytics network element may keep the first IP information corresponding to the application unchanged, add the second IP information corresponding to the application, and send the second indication information, so that the second network element may determine, by using the second indication information, that the application corresponds to the second IP information, and the second network element may perform application analytics on the first data by using the second IP information.

In a possible implementation, the application status of the first data is the foreground state, and the method further includes: The second network element increases a bandwidth of a media data stream in which the first data is located; the second network element increases a scheduling priority of the media data stream in which the first data is located; and/or the second network element increases a coding rate of the media data stream in which the first data is located. In the foregoing solution, the second network element may analyze that the application status of the first data is the foreground state. In this case, the second network element may increase at least one of the following of the media data stream in which the first data is located: increasing the bandwidth, increasing the scheduling priority, and increasing the coding rate, to manage the application status, for example, manage a traffic status of a service. In this embodiment of this application, a data transmission effect of the application in the foreground state can be improved, and user satisfaction with the application in the current foreground state can be improved.

In a possible implementation, the application status of the first data is the background state, and the method further includes: The second network element reduces a bandwidth of a media data stream in which the first data is located; the second network element reduces a scheduling priority of the media data stream in which the first data is located; and/or the second network element reduces a coding rate of the media data stream in which the first data is located. In the foregoing solution, the second network element may analyze that the application status of the first data is the background state. In this case, the second network element may reduce at least one of the following of the media data stream in which the first data is located: reducing the bandwidth, reducing the scheduling priority, and reducing the coding rate, to manage the application status, for example, manage a traffic status of a service. In this embodiment of this application, data transmission of the application in the background state can be reduced, to avoid interference to an application in the foreground state, and ensure a data transmission effect of the application in the current foreground state.

According to a third aspect, an embodiment of this application further provides a communication apparatus. The communication apparatus is specifically a first data analytics network element, and the first data analytics network element includes: a processing module, configured to receive first information of an application from a first network element through a transceiver module, where the first information includes first application description information and/or an application status that correspond/correspond to the application, the first application description information includes an application identifier and first internet protocol IP information that correspond to the application, and the application status includes a foreground state or a background state of the application, where the processing module is configured to determine second information based on the first information, where the second information includes the application identifier and at least one of the following: an application analytics model, at least one application characteristic, and second application description information; and the processing module is configured to send the second information to a second network element through the transceiver module, where the second information is used by the second network element to identify application information corresponding to first data, and the application information corresponding to the first data includes an application identifier and/or an application status of the first data.

In the third aspect of this application, the modules of the communication apparatus may further perform the steps described in the first aspect and the possible implementations of the first aspect. For details, refer to the descriptions in the first aspect and the possible implementations of the first aspect.

According to a fourth aspect, an embodiment of this application further provides a communication apparatus. The communication apparatus is specifically a second network element, and the second network element includes: a processing module, configured to receive second information from a first data analytics network element through a transceiver module, where the second information includes an application identifier of an application and at least one of the following: an application analytics model, at least one application characteristic, and second application description information; and the processing module is configured to determine, based on the second information, application information corresponding to first data, where the application information corresponding to the first data includes an application identifier and/or an application status of the first data, and the application status includes a foreground state or a background state of the application.

In embodiments of this application, the first IP information, the second IP information, and the third IP information may be IP 3-tuple information or IP 5-tuple information.

In the fourth aspect of this application, the modules of the communication apparatus may further perform the steps described in the second aspect and the possible implementations of the second aspect. For details, refer to the descriptions in the second aspect and the possible implementations of the second aspect.

According to a fifth aspect, an embodiment of this application provides a computer-readable storage medium. The computer-readable storage medium stores instructions. When the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communication apparatus. The communication apparatus may include an entity such as a first data analytics device, a second network element, or a chip. The communication apparatus includes a processor and a memory. The memory is configured to store instructions. The processor is configured to execute the instructions in the memory, so that the communication apparatus performs the method according to the first aspect or the second aspect.

According to an eighth aspect, this application provides a chip system. The chip system includes a processor, configured to support a first data analytics device or a second network element in implementing a function in the foregoing aspect, for example, sending or processing data and/or information in the foregoing method. In a possible design, the chip system further includes a memory. The memory is configured to store program instructions and data that are necessary for the first data analytics device or the second network element. The chip system may include a chip, or may include the chip and another discrete component.

According to a ninth aspect, an embodiment of this application provides a communication system, including a first data analytics network element, configured to perform the method according any one of the first aspect and the possible implementations of the first aspect and a first network element. An embodiment of this application further provides another communication system, including a second network element, configured to perform the method according to any one of the second aspect and the possible implementations of the second aspect and a first data analytics network element.

DESCRIPTION OF EMBODIMENTS

The following describes embodiments of this application with reference to the accompanying drawings.

In this specification, the claims, and the accompanying drawings of embodiments of this application, terms such as "first" and "second" are intended to distinguish between similar objects but do not necessarily indicate a specific order or sequence. It should be understood that the terms used in such a way are interchangeable in proper cases. This is merely a distinguishing manner that is used when objects having a same attribute are described in embodiments of this application. In addition, the terms "include", "contain" and any other variants mean to cover non-exclusive inclusion, so that a process, method, system, product, or device that includes a series of units is not necessarily limited to those units, but may include other units not expressly listed or inherent to such a process, method, system, product, or device.

The term "and/or" in embodiments of this application describes only an association relationship for describing associated objects and indicates that three relationships may exist. For example, A and/or B may represent the following three cases: Only A exists, both A and B exist, and only B exists. In addition, in the descriptions of this application, "a plurality of" means two or more than two. In addition, in embodiments of this application, "/" may indicate an and/or relationship.

Figure 1A:
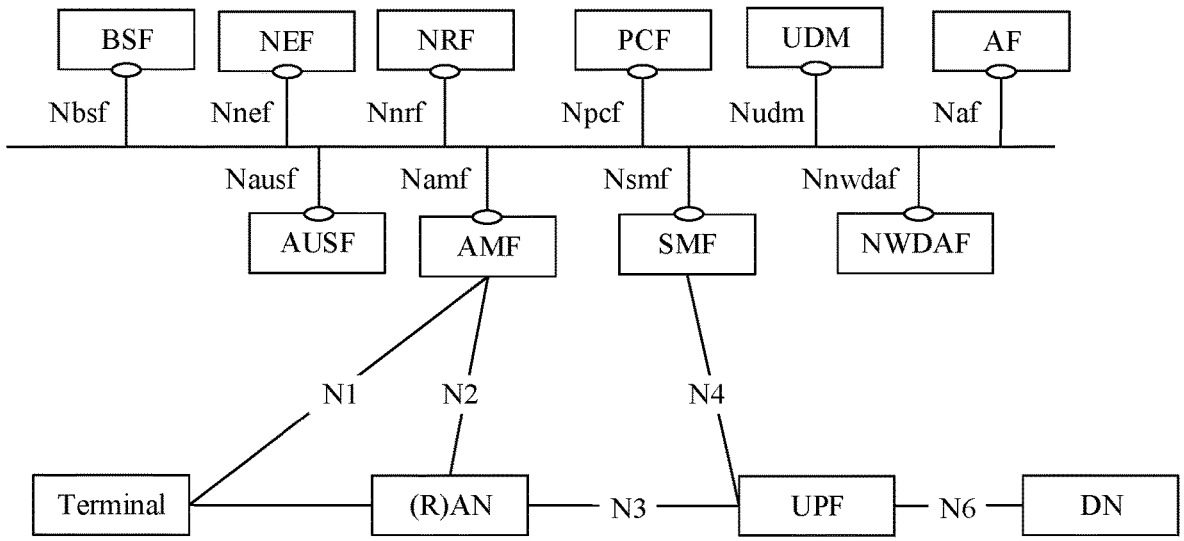
FIG. 1a is a schematic diagram of an architecture of a communication system according to an embodiment of this application.

FIG. 1a shows an example of a schematic diagram of a network architecture of a 5G system based on a service-based interface. In the schematic diagram, the 5G system may include an authentication server function (AUSF) network element, an access and mobility management function (AMF) network element, a data network (DN), a unified data management (UDM) network element, a policy control function (PCF) network element, a (radio) access network ((R)AN) network element, a user plane function (UPF) network element, a terminal device, an application function (AF) network element, an SMF network element, a binding support function (BSF) network element, an NWDAF network element, a network exposure function (NEF) network element, and an NRF network element.

For ease of description, the (R)AN network element, the AMF network element, the SMF network element, the UDM network element, the UPF network element, the PCF network element, the BSF network element, the NWDAF network element, the NRF network element, the NEF network element, and the like are respectively referred to as a RAN, an AMF, an SMF, a UDM, a UPF, a PCF, a BSF, an NWDAF, an NRF, an NEF, and the like in the following descriptions.

The 5G system is divided into two parts: an access network and a core network. The access network is configured to implement a function related to radio access, and mainly includes the RAN. The core network is used for network service control, data transmission, and the like. The core network includes a plurality of network elements, mainly including the AMF, the SMF, the UPF, the PCF, the UDM, and the like.

Functions of some network elements in FIG. 1a are as follows:

The PCF is responsible for providing a policy, for example, a quality of service (QOS) policy or a slice selection policy, for the AMF or the SMF.

The UDM is configured to process 3rd generation partnership project (3GPP) authentication and key agreement (AKA) authentication credentials, user identification processing, access authorization, registration/mobility management, subscription management, and SMS message management. In this application, the UDM may provide a function of storing information about a network element (a serving NF, for example, a serving AMF, a serving SMF, or a serving NWDAF) that currently serves the terminal device.

The AF may be an application server, and may belong to an operator or a third party. The AF mainly supports interacting with a 3GPP core network to provide a service, for example, affect a data routing decision, provide a policy control function, or provide some third-party services to a network side.

The AMF is mainly responsible for a signaling processing part, for example, functions such as registration management of the terminal device, connection management of the terminal device, reachability management of the terminal device, access authorization and access authentication of the terminal device, a security function of the terminal device, mobility management of the terminal device (for example, location update of the terminal device, network registration of the terminal device, and terminal device handover), network slice selection, SMF selection, and registration or deregistration of the terminal device.

The SMF is mainly responsible for all control plane functions of session management of the terminal device, including UPF selection, control, and redirection, internet protocol (IP) address assignment and management, session QoS management, obtaining a policy and charging control (PCC) policy from the PCF, and bearer or session establishment, modification, and release, and the like.

The UPF serves as an anchor of a protocol data unit (PDU) session connection, and is responsible for data packet filtering, data transmission/forwarding, rate control, charging information generation, user plane QoS processing, uplink transmission authentication, transmission level verification, downlink data packet buffering, downlink data notification triggering, and the like of the terminal device. The UPF may also serve as a branching point of a multi-homed PDU session. A resource transmission and scheduling function that is used by the UPF to serve the terminal device is managed and controlled by the SMF.

The NRF is a network element that stores information such as a network element attribute, a network element status, and a network topology relationship, and has a network element discovery function and a network element management function.

The BSF has functions of binding or storing a corresponding terminal device address, a terminal device identifier, a data network name (DNN), a single network slice selection assistance information (S-NSSAI), a PCF instance, and a PCF set identifier for a PDU session. For example, a PCF corresponding to the terminal device may be found from the BSF.

The NWDAF has at least one of the following functions: a data collection function and a data analytics function. The data collection function is used to collect related data from a network element, a third-party service server, a terminal device, or a network management system. The data analytics function is to perform analytics and training based on related input data, and provide a data analytics result to the network element, the third-party service server, the terminal device, or the network management system. The analytics result may assist a network in selecting a quality of service parameter of a service, assist the network in performing traffic routing, assist the network in selecting a background traffic transmission policy, or the like. This application mainly relates to the data collection function of the NWDAF. Because the NWDAF may perform related training and analytics functions based on the collected data, a prerequisite is that the related data can be collected and obtained.

In embodiments of this application, the NWDAF may be an independent network element, or may be co-located with another network element. For example, the NWDAF network element may be co-located with the AMF network element or co-located with the SMF network element.

The RAN is a network including one or more access network devices (which may also be referred to as one or more RAN nodes or network devices), and implements functions such as a radio physical layer function, resource scheduling and radio resource management, radio access control and mobility management functions, quality of service management, and data compression and encryption. The access network device is connected to the UPF through a user plane interface N3, and is configured to transmit data of the terminal device. The access network device establishes a control plane signaling connection to the AMF through a control plane interface N2, to implement functions such as radio access bearer control.

The access network device may be a base station, a wireless fidelity (Wi-Fi) access point (AP), a worldwide interoperability for microwave access (WiMAX) site, or the like. There may be various forms of base stations, for example, a macro base station, a micro base station (also referred to as a small cell), a relay station, and an access point. The base station may be specifically an AP in a wireless local area network (WLAN), a base transceiver station (BTS) in a global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in a future 5G system, a base station in a future evolved public land mobile network (PLMN), or the like.

The terminal device may be a wireless terminal device or a wired terminal device. The wireless terminal device may be a device that provides a user with voice and/or data connectivity, a handheld device having a wireless connection function, or another processing device connected to a wireless modem. The terminal device and the access network device communicate with each other by using an air interface technology (for example, an NR technology or an LTE technology). Terminal devices may also communicate with each other by using an air interface technology (for example, an NR technology or an LTE technology). The wireless terminal device may communicate with one or more core network devices through the access network device, for example, communicate with the AMF, the SMF, or the like. The wireless terminal device may be a mobile terminal device, for example, a mobile phone (or referred to as a "cellular" phone), a smartphone, a satellite wireless device, a wireless modem card, or a computer having a mobile terminal device. For example, the wireless terminal device may be a laptop, a portable, a pocket-sized, a handheld, a computer built-in, or an in-vehicle mobile apparatus that exchanges voice and/or data with the access network device. For example, the wireless terminal device may be a device such as a personal communication service (PCS) phone, a cordless phone, a session initiation protocol (SIP) phone, a wireless local loop (WLL) station, a personal digital assistant (PDA), virtual reality (VR) glasses, augmented reality (AR) glasses, a machine type communication terminal device, or an internet of things terminal device. In internet of vehicles communication, a communication device mounted on a vehicle is a terminal device, and a road side unit (RSU) may also be used as a terminal device. A communication device mounted on an uncrewed aerial vehicle may also be considered as a terminal device. The wireless terminal device may also be referred to as user equipment UE), a terminal, a subscriber unit, a subscriber station, a mobile station, a mobile platform, a remote station, an access point, an access terminal, a user terminal, a user agent, or the like.

The DN is an operator network that provides a data transmission service to a user, for example, an internet protocol multi-media service (IMS) or the Internet. The terminal device accesses the DN by establishing a PDU session between the terminal device and the DN through the access network device and the UPF.

Details are separately described below.

Figure 1B:
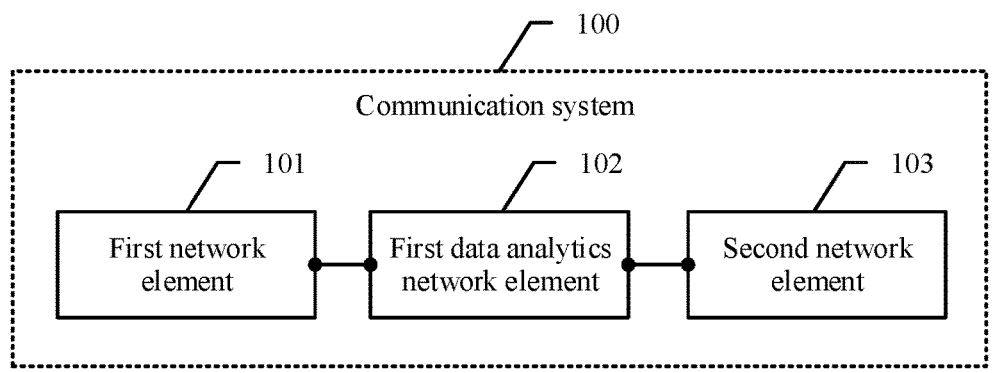
FIG. 1b is a schematic diagram of an architecture of another communication system according to an embodiment of this application.

A communication method provided in embodiments of this application is applied to a communication system. As shown in FIG. 1b, the communication system 100 may include a first network element 101, a first data analytics network element 102, and a second network element 103.

The first network element is configured to send first information of an application to the first data analytics network element, where the first information includes first application description information and/or an application status that correspond/corresponds to the application, the first application description information includes an application identifier and first internet protocol IP information that correspond to the application, and the application status includes a foreground state or a background state of the application.

The first data analytics network element is configured to: receive the first information of the application from the first network element; determine second information based on the first information, where the second information includes the application identifier and at least one of the following: an application analytics model, at least one application characteristic, and second application description information; and send the second information to the second network element, where the second information is used by the second network element to identify application information corresponding to first data, and the application information corresponding to the first data includes an application identifier and/or an application status of the first data.

The second network element is configured to receive the second information from the first data analytics network element, where the second information includes the application identifier of the application and at least one of the following: the application analytics model, the at least one application characteristic, and the second application description information. The second network element determines, based on the second information, the application information corresponding to the first data, where the application information corresponding to the first data includes the application identifier and/or the application status of the first data, and the application status includes a foreground state or a background state of the application.

In this embodiment of this application, the application may be a service, service traffic, data, information, an application, or the like. In subsequent embodiments, an example in which the application is a service is used for description. An application corresponds to application description information. The application may be described by using the application description information. For example, the application description information may include an application identifier and internet protocol (IP) information that correspond to the application. Specifically, the application may be identified by using the application identifier (App ID). Different applications have different application identifiers. For example, the application identifier may be a service identifier. In addition, the application further corresponds to IP information. For example, the IP information may include an IP 3-tuple and/or an IP 5-tuple. In addition, the application may also be referred to as a service. Correspondingly, any description of the application in embodiments of this application may be replaced with the service. For example, the application identifier may be referred to as a service identifier, and the application description information may be referred to as service description information. Details are not described in other parts of embodiments of this application.

In addition, the application may further correspond to an application status. The application status includes a foreground state or a background state of the application. The foreground state is a state of the application that is in the terminal device and that directly interacts with a user, and the background state is a state of the application that is in the terminal device and that does not directly interact with the user. For example, for the terminal device, the terminal device has two types of applications: a voice application and a data application (for example, the WeChat). When the terminal device is in a voice call state, the voice application is in the foreground state. In this case, the data application runs in a background, and the data application is in the background state.

In embodiments of this application, the first network element is a data provider, and the first network element may provide the first information to the first data analytics network element. The first information includes the first application description information and/or the application status that correspond/corresponds to the application. For example, the first network element may be a first network exposure function (NEF) network element. For example, the first NEF network element may obtain, from an application function (AF) network element, the application description information corresponding to the application. The first NEF network element may include a packet flow description function (PFDF) network element. The PFDF network element may be configured to store the application description information. For example, the PFDF network element may be configured to store PFD information. Specifically, for one application, the PFD information includes information corresponding to the application, and includes at least one of the following information: a PFD identifier (ID), an IP 3-tuple, a uniform resource locator (URL), and a domain name matching standard. For example, the PFD ID identifies the PFD information of the application; the IP 3-tuple includes a server IP address, a server port number, and a protocol number; the URL may be used to match a prominent part, for example, a host name, of a service; and the domain name matching standard is used to provide a domain name matching manner.

In embodiments of this application, the first data analytics network element may receive the first information from the first network element, and the first data analytics network element may further generate the second information based on the first information. The first data analytics network element may perform data analytics in a plurality of manners, for example, perform data analytics by using the application analytics model, the at least one application characteristic, or the second application description information. For example, the first data analytics network element includes a network data analytics function (NWDAF) network element, and the NWDAF network element may perform data analytics based on the first information received from the first network element, to generate the second information.

It should be noted that, in embodiments of this application, the NEF network element may be abbreviated as NEF, the NWDAF network element may be abbreviated as NWDAF, and the like. Examples are not described one by one again.

In embodiments of this application, the second network element may receive the second information from the first data analytics network element, and the second network element may further determine, based on the second information, the application information corresponding to the first data, to be specific, the second network element may use the second information to perform application identification, to obtain the application information corresponding to the first data. For example, the application information corresponding to the first data includes the application identifier and/or the application status of the first data, to be specific, the second network element may identify the application identifier corresponding to the first data, or identify the application status corresponding to the first data, or identify the application identifier and the application status that correspond to the first data. In embodiments of this application, the second network element may receive the second information from the first data analytics network element, and identify application analytics on the first data by using the second information. Therefore, an application analytics success rate is improved.

The second network element includes at least one of the following: a first user plane function (UPF) network element, a second data analytics network element, and a second NEF network element. For example, the first UPF network element may generate the second information based on the first information, so that the first UPF may perform application identification on the first data by using the second information. For another example, the first data analytics network element may be a data analytics network element having a training function, and the second data analytics network element may be a data analytics network element having an inference function. For another example, the second network element may be the second NEF network element, and the second NEF network element may generate the second information based on the first information, so that the second NEF network element may perform application identification on the first data by using the second information.

Figure 1C:
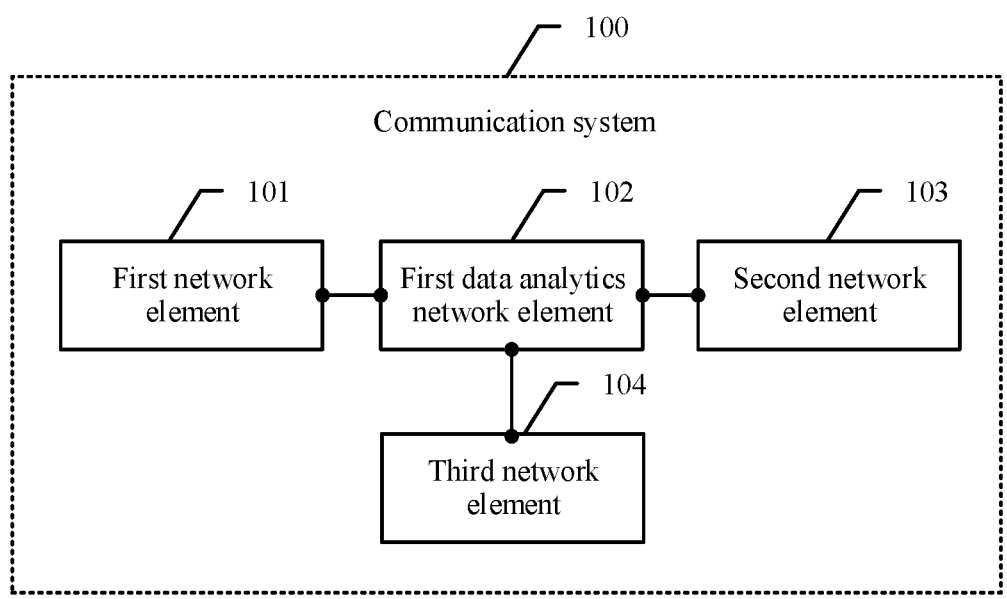
FIG. 1c is a schematic diagram of an architecture of another communication system according to an embodiment of this application.

In some embodiments of this application, as shown in FIG. 1c, the communication system 100 may include a first network element 101, a first data analytics network element 102, a second network element 103, and a third network element 104. The first network element 101, the first data analytics network element 102, and the second network element 103 may be as shown in FIG. 1b. The third network element is configured to send second data corresponding to an application to the first data analytics network element. The first data analytics network element is configured to receive the second data. For example, the second data may be historical application description information corresponding to the application. The historical application description information may be application description information of the application in a historical time period. The first data analytics network element determines second information based on first information and the second data, and the first data analytics network element may perform application analytics by using the first information and the second data, to obtain the second information.

In some embodiments of this application, the third network element includes a second UPF network element, a session management function (SMF) network element, an access and mobility management function (AMF) network element, and an AF network element.

The AMF network element is mainly responsible for mobility management in a mobile network, such as user location update, user network registration, and user switching. The SMF network element is mainly responsible for session management in the mobile network. For example, specific functions of the SMF network element may include: assigning an IP address to a user and selecting a UPF network element that provides a packet forwarding function. The UPF network element is mainly responsible for performing traffic processing, such as forwarding and charging, on a user packet.

For example, the second UPF network element may generate the second data, and send the second data to the first data analytics network element, so that the first data analytics network element may perform application analytics by using the first information and the second data, to obtain the second information. An implementation of the third network element is not limited in embodiments of this application. Any network element that can provide the second data to the first data analytics network element may be used as the third network element.

Figure 2:
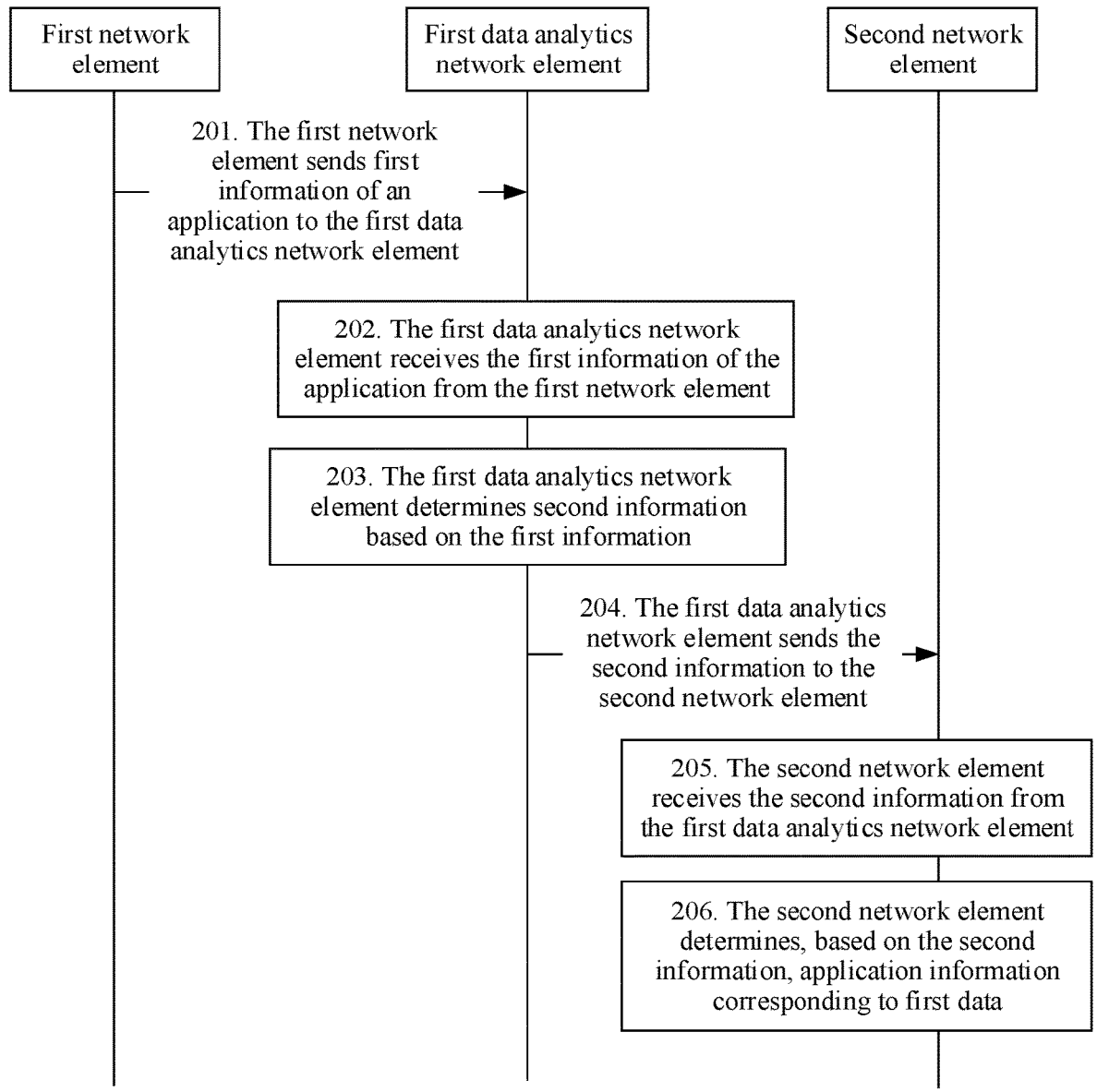
FIG. 2 is a schematic block flowchart of a communication method according to an embodiment of this application.

The following uses a communication method performed between different network elements as an example for detailed description. Refer to FIG. 2. The communication method according to an embodiment of this application may include the following steps.

201. A first network element sends first information of an application to a first data analytics network element, where the first information includes first application description information and/or an application status that correspond/corresponds to the application, the first application description information includes an application identifier and first IP information that correspond to the application, and the application status includes a foreground state or a background state of the application.

In this embodiment of this application, the first network element is a data provider, and the first network element may provide the first information to the first data analytics network element. The first information generated by the first network element includes the first application description information and/or the application status that correspond/corresponds to the application. The first information may include the first application description information corresponding to the application. The first application description information includes the application identifier and the first IP information that correspond to the application. The first application description information may be used by the first data analytics network element to generate second information. For example, the application may be a service. For example, the application identifier may be a service identifier, and the service identifier may be used by the first data analytics network element to generate the second information. For another example, the first information may include the application status corresponding to the application, and the application status may be used as an application characteristic of the application for the first data analytics network element to generate the second information.

202. The first data analytics network element receives the first information of the application from the first network element.

The first data analytics network element may communicate with the first network element, and the first data analytics network element receives the first information of the application. It can be learned from the foregoing descriptions of the first information that the first information may use the corresponding first application description information and/or application status.

203. The first data analytics network element determines the second information based on the first information, where the second information includes the application identifier and at least one of the following: an application analytics model, at least one application characteristic, and second application description information.

After the first data analytics network element receives the first information, the first data analytics network element generates the second information based on the first information. The second information is information used by a second network element to perform application analytics. For example, the first data analytics network element may train a model to obtain the application analytics model, and the second information may include the application identifier and the application analytics model. The first data analytics network element may further perform characteristic extraction to obtain the at least one application characteristic, and the second information may include the application identifier and the at least one application characteristic. The first data analytics network element may further generate the second application description information, where the second information may include the application identifier and the second application description information. For example, the second application description information may include the application identifier corresponding to the application, or the second application description information may include second IP information.

In some embodiments of this application, the application analytics model is used to determine application information corresponding to data. For example, different data corresponds to different application information, where for example, first data corresponds to first application information, and second data corresponds to second application information; and/or the at least one application characteristic corresponds to the application information of the first data, where for example, a first application characteristic corresponds to the first application information, and a second application characteristic corresponds to the second application information; and/or the second application description information includes the second IP information, and both the second application description information and the first application description information correspond to the same application identifier. For example, the second IP information may be IP 3-tuple information or 5-tuple information.

In some embodiments of this application, a communication system may further include a third network element, and the third network element sends the second data corresponding to the application to the first data analytics network element. The first data analytics network element may further perform the following step: The first data analytics network element receives the second data corresponding to the application from the third network element. For example, the second data may be historical application description information corresponding to the application, or the second data may be a historical application status corresponding to the application.

Specifically, step 203 in which the first data analytics network element determines the second information based on the first information includes:

The first data analytics network element determines the second information based on the first information and the second data.

The first data analytics network element receives the first information from the first network element, and receives the second data from the third network element. In this case, the first data analytics network element may determine the second information based on the first information and the second data together, so that the first data analytics network element may send the second information to the second network element, and the second network element performs application analytics on the first data by using the second information.

In some embodiments of this application, the second information includes the application analytics model, and the application analytics model is used to determine the application information corresponding to the data.

Specifically, that the first data analytics network element determines the second information based on the first information and the second data includes:

The first data analytics network element performs model training based on the first information and the second data, to obtain the application analytics model.

The second data may be training data of an original model, and the application analytics model is a model for identifying the application information corresponding to the data. Training of the application analytics model has a plurality of implementations. For example, a process of training the application analytics model is training a classifier by using a supervised machine learning algorithm, for example, logistic regression (LR), a support vector machine (SVM), or a deep neural network (DNN). After completing the model training, the first data analytics network element may output the application analytics model.

In some embodiments of this application, the second information includes the at least one application characteristic, and the at least one application characteristic corresponds to the application information of the first data.

That the first data analytics network element determines the second information based on the first information and the second data includes:

The first data analytics network element performs application characteristic extraction on the second data based on the first information, to obtain the at least one application characteristic corresponding to the application information, where different application information corresponds to different application characteristics.

The second data may include training datasets of a plurality of applications. The first data analytics network element performs application characteristic extraction on second data of each application based on the first information. For example, an unsupervised learning method may be used to determine an application characteristic of each application. The first data analytics network element may use a K-means clustering algorithm. For a training dataset corresponding to an App ID 1, the first data analytics network element clusters the training datasets into K clusters by using the K-means algorithm, the first data analytics network element uses, from the K clusters, a centroid of a cluster that includes a largest quantity of sample data, as an application characteristic 1 corresponding to the APP ID 1. In a similar manner, the first data analytics network element may extract an application characteristic 2 corresponding to an APP ID 2 and an application characteristic 3 corresponding to an APP ID 3. In this embodiment of this application, at least one type of application information corresponds to at least one application characteristic, and different application information corresponds to different application characteristics. Therefore, the first data analytics network element sends the at least one application characteristic corresponding to the at least one type of application information to the second network element, so that the second network element may perform application analytics on the first data by using the application characteristic.

In some embodiments of this application, the second information includes the second application description information, and the second application description information includes the second IP information.

That the first data analytics network element determines the second information based on the first information and the second data includes:

The first data analytics network element determines the application analytics model or the at least one application characteristic based on the first information and the second data;
  the first data analytics network element determines, based on the application analytics model or the at least one application characteristic, application information corresponding to third data, where the application information corresponding to the third data includes an application identifier and/or third IP information of the third data; and the first data analytics network element determines the second application description information based on the application identifier and/or the third IP information of the third data.

The first data analytics network element first determines the application analytics model or the at least one application characteristic based on the first information and the second data. For a manner of determining the application analytics model and the at least one application characteristic, refer to the descriptions in the foregoing embodiment. After determining the application analytics model or the at least one application characteristic, the first data analytics network element may determine, based on the application analytics model or the at least one application characteristic, the application information corresponding to the third data. For example, the application information corresponding to the third data includes the application identifier and/or the third IP information of the third data, where the third IP information may be determined based on IP 5-tuple information (including the third IP information) of the third data. The first data analytics network element may determine the second application description information by using the application identifier and/or the third IP information of the third data, where the second IP information in the second application description information may be the third IP information corresponding to the third data. Therefore, the first data analytics network element sends the second application description information to the second network element, so that the second network element may perform application analytics on the first data by using the second application description information.

Specifically, there may be a plurality of pieces of third data. In this case, the first data analytics network element may determine, based on the application analytics model or the at least one application characteristic and the third data, application information corresponding to the plurality of pieces of third data (namely, an application identifier and/or third IP information of each of the plurality of pieces of third data), to determine the third data based on the application information corresponding to the plurality of pieces of third data, and determine the second application description information. Specifically, the first data analytics network element may perform statistics collection or prediction based on the application information corresponding to the plurality of pieces of third data, to determine the third data, and determine the second application description information.

Further, in this embodiment of this application, the second application description information includes the second IP information, and the method performed by the first data analytics network element may further include the following steps:

The first data analytics network element determines that the first IP information of the application is updated to the second IP information; and
  the first data analytics network element sends first indication information to the second network element, where the first indication information indicates that the second IP information is updated IP information of the first IP information.

The first data analytics network element may update the first IP information corresponding to the application to the second IP information, and send the first indication information, so that the second network element may determine, by using the first indication information, that the application corresponds to the second IP information, and the second network element may perform application analytics on the first data by using the second IP information.

Further, in this embodiment of this application, the second application description information includes the second IP information, and the method performed by the first data analytics network element may further include the following steps:

The first data analytics network element determines that the second IP information is newly added IP information of the application; and
  the first data analytics network element sends second indication information to the second network element, where the second indication information indicates that the second IP information is the newly added IP information of the application.

The first data analytics network element may keep the first IP information corresponding to the application unchanged, add the second IP information corresponding to the application, and send the second indication information, so that the second network element may determine, by using the second indication information, that the application corresponds to the second IP information, and the second network element may perform application analytics on the first data by using the second IP information.

204. The first data analytics network element sends the second information to the second network element, where the second information is used by the second network element to identify the application information corresponding to the first data, and the application information corresponding to the first data includes an application identifier and/or an application status of the first data.

In this embodiment of this application, after the first data analytics network element determines the second information, the first data analytics network element communicates with the second network element to send the second information. The second information is information used by the second network element to perform application analytics. For example, the first data is to-be-analyzed data of the second network element. After receiving the second information, the second network element may identify, by using the second information, the application information corresponding to the first data. For example, the first data may also be referred to as inference data, and is used to generate a data analytics result.

205. The second network element receives the second information from the first data analytics network element, where the second information includes the application identifier of the application and at least one of the following: the application analytics model, the at least one application characteristic, and the second application description information.

In this embodiment of this application, after the first data analytics network element determines the second information, the first data analytics network element communicates with the second network element to send the second information, and the second network element communicates with the first data analytics network element to receive the second information. The second information includes the application identifier of the application and at least one of the following: the application analytics model, the at least one application characteristic, and the second application description information. For descriptions of the second information, refer to step 203. Details are not described herein again.

206. The second network element determines, based on the second information, the application information corresponding to the first data, where the application information corresponding to the first data includes an application identifier and/or an application status of the first data, and the application status includes a foreground state or a background state of the application.

In this embodiment of this application, because the second network element may receive at least one of the following: the application analytics model, the at least one application characteristic, and the second application description information, the second network element may identify the first data by using the second information. In this embodiment of this application, the second network element may identify the first data by using the application identifier and at least one of the following: the application analytics model, the at least one application characteristic, and the second application description information, so as to identify the application information of the first data, and improve an application analytics success rate.

In some embodiments of this application, the second information includes the application analytics model, and the application analytics model is used to determine the application information corresponding to the data.

Specifically, step 206 in which the second network element determines, based on the second information, the application information corresponding to the first data includes:

The second network element obtains a first characteristic parameter from the first data; and
  the second network element inputs the first characteristic parameter into the application analytics model, and outputs the application information corresponding to the first data through the application analytics model.

The second network element may obtain the application analytics model from the first data analytics network element, the second network element obtains the first characteristic parameter from the first data, and then the second network element inputs the first characteristic parameter into the application analytics model. Because the application analytics model is used to determine the application information corresponding to the data, the application information corresponding to the first data may be output through the application analytics model, and the second network element may implement application analytics on the first data by using the application analytics model.

In some embodiments of this application, the second information includes the at least one application characteristic, and the at least one application characteristic corresponds to the application information of the first data.

Specifically, step 206 in which the second network element determines, based on the second information, the application information corresponding to the first data includes:

The second network element obtains a second characteristic parameter from the first data; and the second network element matches the second characteristic parameter with the at least one application characteristic, to obtain an application characteristic that successfully matches the second characteristic parameter, where application information corresponding to the application characteristic that successfully matches the second characteristic parameter is the application information corresponding to the first data.

The second network element may obtain the at least one application characteristic from the first data analytics network element, the second network element obtains the second characteristic parameter from the first data, and the second network element matches the second characteristic parameter with the at least one application characteristic. Because application characteristics of different applications are different, the at least one application characteristic corresponds to the application information of the first data. The application characteristic that successfully matches the second characteristic parameter may be obtained through characteristic matching, and the application information corresponding to the application characteristic that successfully matches the second characteristic parameter is the application information corresponding to the first data. The second network element may implement application analytics on the first data by using the at least one application characteristic.

In some embodiments of this application, the second information includes the second application description information, and the second application description information includes the second IP information.

Specifically, step 206 in which the second network element determines, based on the second information, the application information corresponding to the first data includes:

The second network element determines IP information of the first data; and the second network element determines, based on the IP information of the first data and the second IP information corresponding to the application, the application information corresponding to the first data.

The second network element may obtain, from the first data analytics network element, the second IP information included in the second application description information. The second network element determines the IP information of the first data, and performs analytics by using the IP information of the first data and the second IP information corresponding to the application. When the IP information of the first data is the same as the second IP information corresponding to the application, the second network element may determine that application information corresponding to the second IP information is the application information corresponding to the first data. The second network element may implement application analytics on the first data by using the second application description information.

Further, in some embodiments of this application, before the second network element receives the second information from the first data analytics network element, the method further includes:

when the second network element includes a second data analytics network element, the second network element generates filtering information based on a preset data analytics filtering condition, and sends the filtering information to the first data analytics network element, where the filtering information requests the second information;

when the second network element includes a first user plane function UPF network element, the second network element filters second data based on a preset event filtering condition, and sends filtered second data to the first data analytics network element, where the filtered second data is used by the first data analytics network element to determine the second information; or when the second network element includes a second network exposure function NEF network element, the second network element sends the first application description information to the first data analytics network element, where the first application description information includes the application identifier and the first IP information that correspond to the application, and the first application description information is used by the first data analytics network element to determine the second information.

When the second network element includes the second data analytics network element, the second network element obtains the preset data analytics filtering condition. The data analytics filtering condition is used to describe data that needs to be filtered out. For example, the data analytics filtering condition may include at least one of the following: an application identifier (App ID), a network slice identifier, a data network name (DNN), and a network area (network area). For example, the network slice identifier may be a single network slice selection assistance information (S-NSSAI). The second network element generates the filtering information based on the data analytics filtering condition, and sends the filtering information to the first data analytics network element. The first data analytics network element may perform data filtering by using the data analytics filtering condition, to filter out data that satisfies the data analytics filtering condition. Then, the first data analytics network element may send the second information to the second data analytics network element based on the filtering information. In this embodiment of this application, the filtering information indicates the first data analytics network element to perform data filtering, and may further request the first data analytics network element to send the second information, so that the second data analytics network element may receive the second information.

When the second network element includes the first user plane function UPF network element, the second network element obtains the preset event filtering condition, filters the second data by using the event filtering condition, and sends the filtered second data to the first data analytics network element, so that the first data analytics network element can determine the second information by using the filtered second data, and second information generation efficiency is improved.

In some embodiments of this application, the second network element includes the second NEF network element, and the second network element may further perform the following steps:

The second network element receives first indication information from the first data analytics network element; and the second network element determines, based on the first indication information, that the second IP information included in the second application description information is updated IP information of the first IP information.

The first data analytics network element may update the first IP information corresponding to the application to the second IP information, and send the first indication information, so that the second network element may determine, by using the first indication information, that the application corresponds to the second IP information, and the second network element may perform application analytics on the first data by using the second IP information.

In some embodiments of this application, the second network element includes the second NEF network element, and the second network element may further perform the following steps:

The second network element receives second indication information from the first data analytics network element; and the second network element determines, based on the second indication information, that the second IP information included in the second application description information is newly added IP information of the application.

The first data analytics network element may keep the first IP information corresponding to the application unchanged, add the second IP information corresponding to the application, and send the second indication information, so that the second network element may determine, by using the second indication information, that the application corresponds to the second IP information, and the second network element may perform application analytics on the first data by using the second IP information.

In some embodiments of this application, the application information corresponding to the first data includes the application identifier of the first data, and the method further includes:

The second network element obtains policy information of the first data based on the application identifier of the first data.

When the second network element determines the application identifier of the first data, the second network element may further obtain the policy information corresponding to the application identifier of the first data. For example, the policy information may be a management policy of the application, so as to manage the application, for example, manage traffic of a service.

In some embodiments of this application, the application status of the first data is the foreground state, and the method further includes:

The second network element increases a bandwidth of a media data stream in which the first data is located;

the second network element increases a scheduling priority of the media data stream in which the first data is located; and/or the second network element increases a coding rate of the media data stream in which the first data is located.

The second network element may analyze that the application status of the first data is the foreground state. In this case, the second network element may increase at least one of the following of the media data stream in which the first data is located: increasing the bandwidth, increasing the scheduling priority, and increasing the coding rate, to manage the application status, for example, manage a traffic status of the service. In this embodiment of this application, a data transmission effect of the application in the foreground state can be improved, and user satisfaction with the application in the current foreground state can be improved.

In some embodiments of this application, the application status of the first data is the background state, and the method further includes:

The second network element reduces a bandwidth of a media data stream in which the first data is located;

the second network element reduces a scheduling priority of the media data stream in which the first data is located; and/or the second network element reduces a coding rate of the media data stream in which the first data is located.

The second network element may analyze that the application status of the first data is the background state. In this case, the second network element may reduce at least one of the following of the media data stream in which the first data is located: reducing the bandwidth, reducing the scheduling priority, and reducing the coding rate, to manage the application status, for example, manage a traffic status of the service. In this embodiment of this application, data transmission of the application in the background state can be reduced, to avoid interference to an application in the foreground state, and ensure a data transmission effect of the application in the current foreground state.

It can be learned from the example descriptions in the foregoing embodiment that the first data analytics network element first receives the first information of the application from the first network element, where the first information of the application includes the first application description information and/or the application status that correspond/corresponds to the application, the first application description information includes the application identifier and the first IP information that correspond to the application, and the application status includes the foreground state or the background state of the application. After receiving the first information, the first data analytics network element may determine the second information based on the first information, where the second information includes the application identifier and at least one of the following: the application analytics model, the at least one application characteristic, and the second application description information. The first data analytics network element sends the second information to the second network element, where the second information is used by the second network element to identify the application information corresponding to the first data, and the application information corresponding to the first data includes the application identifier and/or the application status of the first data. In this embodiment of this application, the first data analytics network element may determine at least one of the following: the application analytics model, the at least one application characteristic, and the second application description information. The second information is sent to the second network element, so that the second network element may receive at least one of the following: the application analytics model, the at least one application characteristic, and the second application description information. Therefore, the second network element may identify the first data by using the second information. In this embodiment of this application, the second network element may identify the first data by using the application identifier and at least one of the following: the application analytics model, the at least one application characteristic, and the second application description information, so as to identify the application information of the first data, and improve the application analytics success rate.

In some embodiments of this application, the second network element first receives the second information from the first data analytics network element, where the second information includes the application identifier of the application and at least one of the following: the application analytics model, the at least one application characteristic, and the second application description information; and the second network element determines, based on the second information, the application information corresponding to the first data, where the application information corresponding to the first data includes the application identifier and/or the application status of the first data, and the application status includes the foreground state or the background state of the application. Because the second network element may receive at least one of the following: the application analytics model, the at least one application characteristic, and the second application description information, the second network element may identify the first data by using the second information. In this embodiment of this application, the second network element may identify the first data by using the application identifier and at least one of the following: the application analytics model, the at least one application characteristic, and the second application description information, so as to identify the application information of the first data, and improve the application analytics success rate.

To better understand and implement the foregoing solutions in embodiments of this application, the following uses corresponding application scenarios as examples for specific description.

Figure 3:
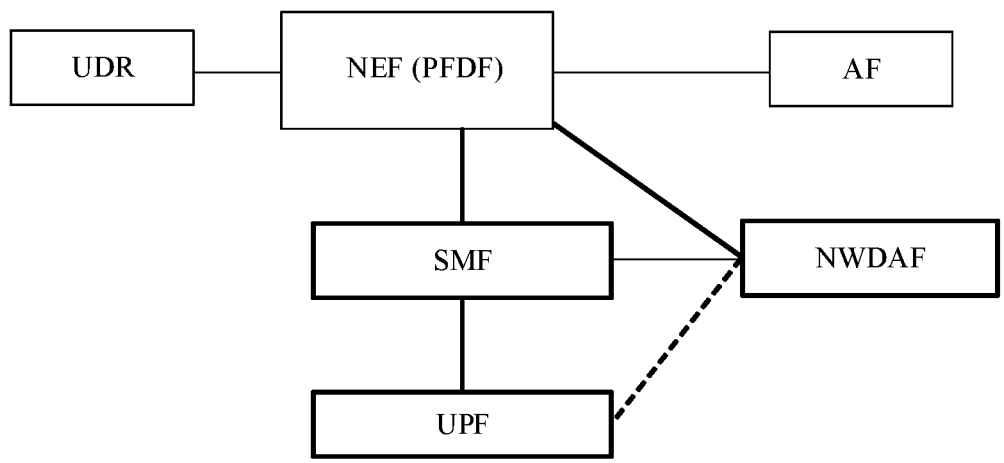
FIG. 3 is a schematic diagram of a system architecture used for a communication method according to an embodiment of this application.

FIG. 3 is a schematic diagram of a system architecture used for a communication method according to an embodiment of this application. The system architecture may include a user data repository (UDR), an NEF, an AF, an SMF, an NWDAF and a UPF.

The UDR and the NEF communicate with each other. The AF and the NEF communicate with each other. The NEF, the UDR, the AF, the SMF, and the NWDAF communicate with each other. The SMF, the NEF, the UPF, and the NWDAF communicate with each other. The NWDAF, the NEF, and the SMF communicate with each other. The UPF and the SMF communicate with each other. Optionally, the NWDAF and the UPF communicate with each other.

Specifically, the UDR is configured to store PFD information (Info).

The NEF may include a PFDF. The NEF may be specifically the foregoing first network element. The NEF is configured to provide first information to the NWDAF. The first information may include historical PFD information. For example, the historical PFD information may include an IP 3-tuple (tuple), an application identifier (App ID), a primary domain name (Domain Name), and a URL.

The NEF is further configured to obtain second information from the NWDAF, where the second information includes the App ID, the IP 3-tuple, the domain name, and the URL. The NEF is configured to send the second information to the UPF. For example, the NEF sends the second information to the UPF through the SMF, or sends the second information to the UPF through the NEF.

The NWDAF may be the foregoing first data analytics network element. The NWDAF is configured to obtain the historical PFD information from the NEF (PFDF), including the IP 3-tuple, the App ID, the domain name, and the URL.

The NWDAF is configured to obtain first traffic information from the UPF. For example, the UPF may be the foregoing third network element, the first traffic information may be the foregoing second data, and the first traffic information includes the IP 3-tuple and historical service traffic data. The traffic data includes a data volume, data duration, a quantity of transmitted data packets, and the like.

The NWDAF is configured to determine the second information based on the historical PFD information and the first traffic information, where the second information may be used to determine an App ID of the second traffic information. The first traffic information is historical traffic information, the second traffic information is current, online, or real-time traffic information, and the second traffic information may be the foregoing first data.

The NWDAF is configured to send the second information to a second network element.

Specifically, that the NWDAF determines the second information based on the historical PFD information and the first traffic information includes:

The NWDAF determines a first training dataset based on the historical PFD information and the first traffic information that are associated with the IP 3-tuple, where the first training dataset includes the App ID, the domain name, the URL, and the traffic data.

The NWDAF determines the second information based on the first training set.

The second information includes an application analytics model, at least one application characteristic, or second PFD information. For example, the application analytics model may be specifically a service classifier. For example, the service classifier may be a multi-classifier that supports service classification, and the at least one application characteristic may be a traffic characteristic corresponding to a service.

If the second information includes the service classifier, the second information further includes one or more service identifiers of one or more services that can be distinguished by the service classifier.

If the second information includes the traffic characteristic corresponding to the service, the second information further includes a service identifier corresponding to the service.

If the second information includes the second PFD information, the second information further includes a service identifier corresponding to the second PFD information.

The UPF may be the foregoing second network element, and the UPF is configured to obtain the second information from the NWDAF. The second information includes the service classifier, the traffic characteristic corresponding to the service, or the second PFD information. The UPF is configured to identify, based on the second information, service information corresponding to the second traffic information.

In the system architecture shown in FIG. 3, for services corresponding to one or more App IDs, in embodiments of this application, the NWDAF may include an NWDAF (denoted as a training NWDAF or an NWDAF 2) that supports a training function and an NWDAF (denoted as an inference NWDAF or an NWDAF 1) that supports an inference function. Based on historical PFD information (assuming that the historical PFD information is an App ID, a first IP 3-tuple, and the like) and corresponding historical traffic information (traffic in one or more service data flows of one or more IP 5-tuples corresponding to the first IP 3-tuple) collected from the UPF, the NWDAF 2 may train a multi-classifier that supports service classification or learn a traffic characteristic corresponding to each service, and assist the NWDAF 1 that supports the inference function on a UPF side in inputting new traffic data into the multi-classifier or one-to-one matching new traffic data with a traffic characteristic corresponding to the service, to finally determine an App ID corresponding to the new traffic data. The first IP 3-tuple may be provided by the AF through the PFDF.

In addition, after long-time inference, the NWDAF 1 may further learn and determine that a specific IP 3-tuple corresponds to an App ID (where the App ID corresponds to a second IP 3-tuple). In a subsequent inference process, an App ID does not need to be determined by using the foregoing multi-classifier or traffic characteristic matching, and an App ID corresponding to the new traffic data may be determined by extracting only an IP 3-tuple in an IP 5-tuple corresponding to the new traffic data. The second IP 3-tuple is learned by the NWDAF 1.

Without any limitation, in embodiments of this application, the NWDAF supporting the training function and the NWDAF supporting the inference function may be combined into a same NWDAF. In other words, the NWDAF 2 and the NWDAF 1 may be a same NWDAF. The following provides detailed descriptions by using four embodiments.

EMBODIMENT 1

A training function module (for example, an NWDAF 2) of an NWDAF trains a service classifier or learns a traffic characteristic of each service based on historical PFD information and historical traffic information that correspond to an App ID, and then installs the service classifier or the traffic characteristic on an inference function module (an NWDAF 1) of the NWDAF. In an inference process, traffic data corresponding to a real-time service flow is input into the service classifier or matches with the traffic characteristic of the service, so that an App ID of the service flow may be determined. In this embodiment of this application, when an AF does not provide or update PFD information, the NWDAF may still determine, by using the service classifier or the service traffic characteristic, the App ID corresponding to the new service flow.

Figure 4:
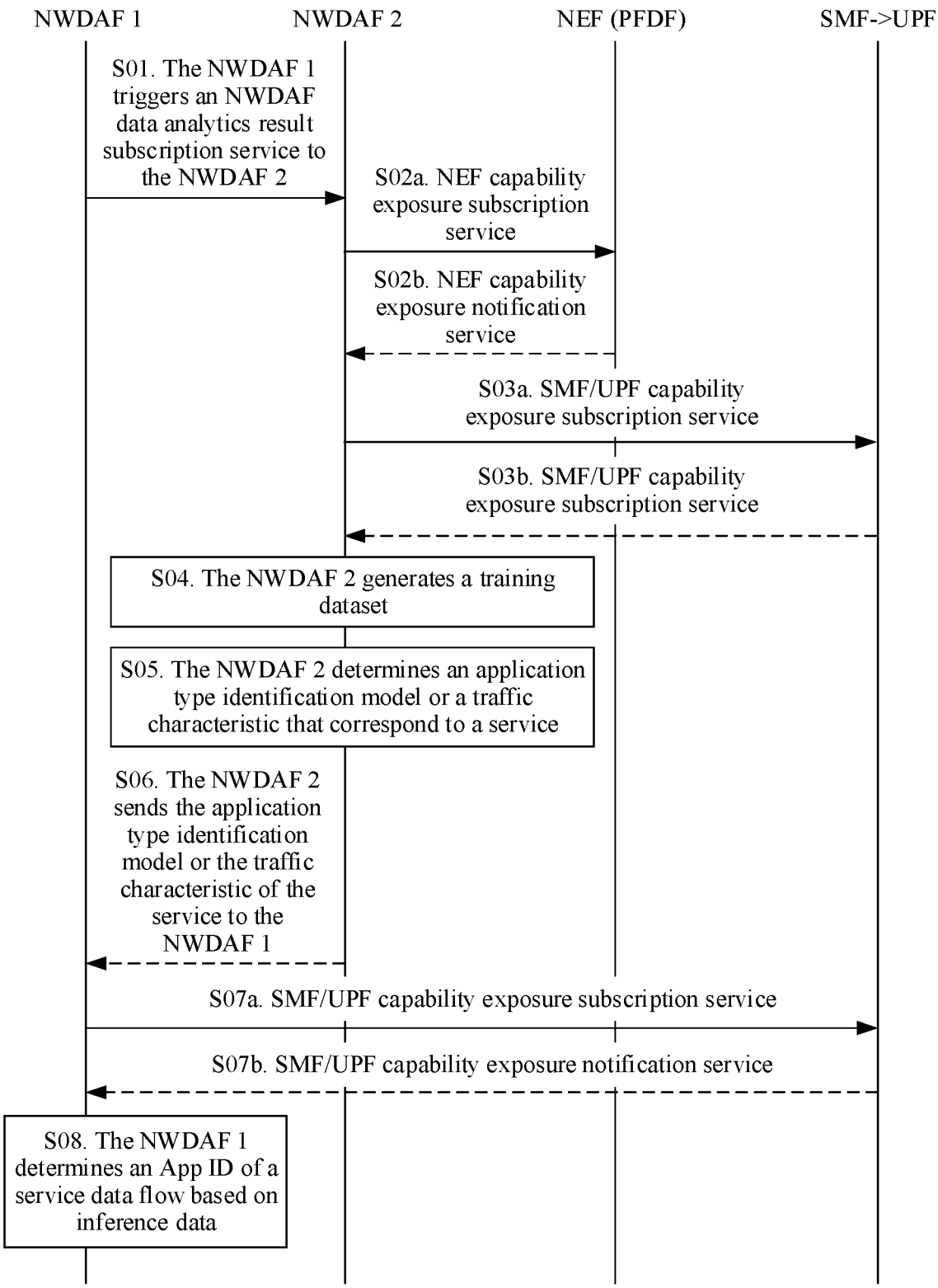
FIG. 4 is a schematic interaction diagram in an application scenario of a communication method according to an embodiment of this application.

FIG. 4 mainly includes the following procedures.

S01. The NWDAF 1 triggers an NWDAF data analytics result subscription service Nnwdaf_AnalyticsSubscription_Subscribe to the NWDAF 2, to request a service classifier or a service traffic characteristic. The Nnwdaf is a service interface of the NWDAF. Both the NWDAF 1 and the NWDAF 2 may be used to determine an App ID corresponding to a service data flow. The NWDAF 1 is an NWDAF supporting an inference function, and the NWDAF 2 is an NWDAF supporting a training function. The service operation includes the following information:

an analytics identifier (Analytics ID, for example, a service analytics model Application Analytics Model and an application characteristic or Signature or Feature), where the service analytics model Application Analytics Model is configured to request an application type identification model or an application status identification model from the NWDAF 2, where the application type identification model may identify an App ID or a service status (including a background state or a foreground state) of at least one service; for example, the application type identification model is a classifier. If only one service can be identified, the classifier may be a binary classifier. If two or more services can be identified, the classifier may be a multi-classifier; in an inference process, the application type identification model installed on the NWDAF 1 may determine an App ID of a real-time service data flow based on traffic data input of the real-time service data flow, where the traffic data of the real-time service data flow is inference data; and the application characteristic or Signature or Feature requests a traffic characteristic of each of one or more services from the NWDAF 2, where in an inference process, the traffic characteristic installed on the NWDAF 1 may one-to-one match traffic data (that is, inference data) input of a real-time service data flow. When the matching succeeds, a corresponding App ID is the App ID of the service data flow; and an analytics filter Analytics Filter may include a plurality of types of filtering information. For example, the analytics filter may be an application identifier App ID, a slice identifier S-NSSAI, a data network name DNN, and a network area Network Area. The filtering information may be used together, for example, limited to a service in a slice.

There may be one or more App IDs. The NWDAF 1 may specify that an application type identification model is trained for services corresponding to the App IDs, or a traffic characteristic of a service is extracted for a service corresponding to each of the App IDs.

For example, it is assumed that service identification needs to be performed on three services (a service 1, a service 2, and a service 3). The NWDAF 1 may collect traffic information corresponding to the three services (refer to Table 1 below) and traffic information corresponding to another service. In this way, the NWDAF 1 may obtain training data.

TABLE 1

| Data | Data source | Descriptions |
| --- | --- | --- |
| Terminal identifier SUPI | SMF/UPF | Terminal identifier |
| IP 5-tuple | SMF/UPF | IP 5-tuple |
| Slice identifier S-NSSAI | SMF/UPF | Slice |
| Data network name DNN | SMF/UPF | DNN |
| Start time point and end time point of data packet transmission Start/end time | SMF/UPF | Start/End time point |
| Data volume Data volume | SMF/UPF | Traffic volume (uplink (UL)/downlink (DL)) |
| Data duration Data duration | SMF/UPF | Traffic duration (UL/DL) |
| QoS flow bit rate QoS flow Bit Rate | SMF/UPF | Observation bandwidth (UL/DL) |
| Quantity of transmitted packets Packet transmission | SMF/UPF | Quantity of observation packets (per UL/DL) |
| Data packets Payload packets | SMF/UPF | User-plane data packet collection |

After the NWDAF 1 obtains the training data shown in Table 1, the NWDAF 1 may train an application type identification model based on the training data. The application type identification model may perform service classification on traffic information corresponding to a new service flow, and services may be classified into a service 1, a service 2, a service 3, and another service.

The S-NSSAI is a slice identifier of a network slice. The NWDAF 1 may specify that an application type identification model is trained for all services in the slice, or a traffic characteristic of a service is extracted for each service in the slice.

The DNN is a data network name. The NWDAF 1 may specify that an application type identification model is trained for all services in a data network corresponding to the DNN, or a traffic characteristic of a service is extracted for each service in the data network corresponding to the DNN.

An area of Interest is information about an area. The NWDAF 1 may specify that an application type identification model is trained for all services in the area, or a traffic characteristic of a service is extracted for each service in the area.

S02a. The NWDAF 2 triggers an NEF capability exposure subscription service Nnef_EventExposure_Subscribe to an NEF, and subscribes to historical PFD information corresponding to an App ID from the NEF. The service operation needs to include an event identifier (Event ID, for example, packet flow description information PFD Info) and event filtering information (Event Filter, for example, an application identifier App ID, an S-NSSAI, a DNN, and an area of interest).

There may be one or more App IDs herein, and the App ID may be obtained from the NWDAF 1 in step S01, or may be obtained by the NWDAF 2 through querying from a UDR or a PCF by using one or more of the S-NSSAI, the DNN, and the area of interest.

In addition, the historical PFD information collected by the NWDAF 2 from the NEF may be stored in a PFDF co-located with the NEF.

S02b. The NEF triggers an NEF capability exposure notification service Nnef_EventExposure_Notify to the NWDAF 2, and provides the historical PFD information corresponding to the App ID to the NWDAF 2, where the service operation includes the following information:

an App ID, where if a plurality of App IDs are carried in step S02a, the NEF needs to include the App ID when feeding back the PFD information. Otherwise, the NWDAF 2 cannot determine a service to which the PFD information belongs; and a PFD ID: identifies PFD information of a service.

The historical PFD information may further include one or more of the following information:

an IP 3-tuple: including a server IP address, a server port number, and a protocol number;

a prominent part that is in a URL and that can be used to match a service, for example, a host name; and a domain name matching standard.

S03a. The NWDAF 2 triggers an SMF/UPF capability exposure subscription service Nsmf/upf_EventExposure_Subscribe to the SMF/UPF, and subscribes to traffic information from the NWDAF 2, where the Nsmf is a service interface of the SMF, and the service operation includes an event identifier (Event ID, for example, traffic information Traffic Info) and event filtering information (Event Filter, for example, application identifier App ID, S-NSSAI, DNN, and area of interest). The traffic information is ultimately from the UPF. Therefore, the NWDAF 2 obtains the traffic information in two manners:

Manner 1: The NWDAF 2 performs subscription from the SMF through the Nsmf interface, and the SMF performs subscription from the UPF through an N4 interface.

Manner 2: The NWDAF 2 performs subscription from the UPF through an Nupf interface.

The event filter is generated when the NWDAF determines to collect data from the UPF. Then, in a process of subscribing to data from the UPF, the NWDAF sends the event filter to the UPF. The UPF installs the event filter locally and collects data based on a filter condition of the event filter. For example, the event filter may specify a filter condition corresponding to traffic information that needs to be reported by the UPF, such as an App ID, an S-NSSAI, a DNN, and a network area.

S03b. The SMF/UPF triggers an SMF/UPF capability exposure subscription service Nsmf/upf_EventExposure_Subscribe to the NWDAF 2, to send the traffic information to the SMF/UPF. For the traffic information, refer to Table 1. For the two different data subscription manners in S03a, the UPF may provide the traffic information to the NWDAF 2 in the following two manners.

Manner 1: The UPF provides the traffic information to the SMF through the N4 interface, and the SMF provides the traffic information to the NWDAF 2 through the Nsmf interface. This manner is only for the subscription manner 1 in step S03a.

Manner 2: The UPF directly provides the traffic information to the NWDAF 2 through the Nupf interface. This manner may be for the subscription manner 1 in step S03a, and may be for the subscription manner 2 in step S03a.

The traffic information that can be provided by the UPF is shown in the foregoing Table 1, and details are not described herein again. It should be noted that the traffic information provided by the UPF is at a granularity of an IP 5-tuple, that is, a granularity of a service data flow. Information included in the IP 5-tuple is a terminal IP address, a terminal port number, a server IP address, a server port number, and a protocol number. The server IP address, the server port number, and the protocol number are also referred to as an IP 3-tuple.

S04. The NWDAF 2 generates a training dataset, where a format of the training dataset is shown in Table 2. Table 2 is a training dataset used to train an application type identification model or determine a service traffic characteristic. It is assumed that there are only three App IDs, and there are a total of N pieces of sample data. In a specific process, for one piece of traffic information from the UPF, the NWDAF 2 first extracts a server IP address, a server port number, and a protocol number from an IP 5-tuple of the traffic information, and then queries, from historical PFD information, an App ID corresponding to the server IP address, the server port number, and the protocol number, so that a piece of sample data can be determined in this data association manner.

TABLE 2

| Traffic information | App ID |
| --- | --- |
| Traffic Data 1 | App ID 1 |
| Traffic Data 2 | App ID 2 |
| Traffic Data 3 | App ID 1 |
| Traffic Data 4 | App ID 3 |
| Traffic Data 5 | App ID 1 |
| . . . | . . . |
| Traffic Data N | App ID 2 |

In this process, to prevent a case in which PFD information provided by an AF deceives a network, to be specific, a case in which some IP 3-tuples in the PFD information originally need to correspond to an App ID X, but are actually used to transmit an App ID Y, in a process of generating a training dataset of the App ID X, the NWDAF 2 may cluster an original training dataset of the App ID X. It is assumed that there are K clusters, and the NWDAF uses a sample dataset that includes a largest quantity of sample data in the K clusters as a processed training dataset of the App ID X.

S05. The NWDAF 2 determines an application type identification model or a traffic characteristic that correspond to a service.

Based on the training dataset, the NWDAF 2 may train, for a plurality of services (for example, the foregoing three services), an application type identification model that can identify the services; in addition, the NWDAF 2 may train or learn, for each of the plurality of services, a traffic characteristic corresponding to the service.

A difference between the application type identification model and the traffic characteristic is described as follows: The application type identification model is a machine learning model, and the traffic characteristic is a matching rule corresponding to an App ID. Both of the application type identification model and the traffic characteristic can be used to determine an App ID of a service flow for traffic information of the service flow. The application type identification model converts traffic information into an eigenvector and inputs the eigenvector into the model to obtain an App ID. The traffic characteristic converts traffic information into an eigenvector and matches the eigenvector with a matching rule. An App ID can be determined only when the matching succeeds.

Specifically, a process of training the application type identification model by the NWDAF 2 is training a classifier by using a supervised machine learning algorithm, for example, logistic regression or a support vector machine. Using logistic regression as an example, the classifier (for example, a binary classifier for an App ID 1 and a non-App ID 1) may be represented as follows:

$$y_i = \begin{cases} 0, z_i < 0 \\ 1, z_i \geq 0 \end{cases}$$

$$z_i = w_0 \times x_{i0} + w_1 \times x_{i1} + w_2 \times x_{i2} + w_3 \times x_{i3} + \ldots + w_D \times x_{iD}.$$

In the foregoing formula:
$y_i$ is a service classification result of traffic data of an $i^{th}$ service data flow, if $y_i=1$, App ID=1; or if $y_i=0$, non-App ID=1;
$z_i$ is an intermediate data value obtained by performing linear regression on $x_i$;
$x_i = \{x_{i0}, x_{i1}, x_{i2}, x_{i3}, \ldots, x_{iD}\}$ is a vector converted from the traffic data of the $i^{th}$ service data flow, where $x_{i0}, x_{i1}, x_{i2}, x_{i3}, \ldots, x_{iD}$ is traffic data of service data flows, for example, a start time point of communication or interaction, an uplink or downlink packet delay, and a quantity of uplink or downlink packets; for details, refer to the foregoing Table 1; and
$w = \{w_0, w_1, w_2, w_3, \ldots, w_D\}$ is a weight.

The foregoing algorithm example is binary classification. If the algorithm instance is multi-classification, for example, referring to the training dataset in Table 2, a classifier that can perform four-class classification (an APP ID 1, an App ID 2, an App ID 3, another service type, and the like) is required. For a multi-classification machine learning algorithm, details are not described herein again.

Specifically, the NWDAF 2 may further use an unsupervised learning method (for example, K-means) in a process of determining the traffic characteristic of each service. For example, for a training dataset corresponding to the App ID 1, the NWDAF 2 clusters the training dataset into K clusters by using the K-means algorithm, and the NWDAF 2 uses a centroid of a cluster that includes a largest quantity of sample data in the K clusters as the traffic characteristic corresponding to the App ID 1. Details about the K-means algorithm are not described herein again.

S06. The NWDAF 2 triggers an NWDAF analytics result notification service Nnwdaf_AnalyticsSubscription_Notify to the NWDAF 1, and the NWDAF 2 sends the application type identification model or the traffic characteristic of the service to the NWDAF 1.

S07a. The NWDAF 1 triggers an SMF/UPF capability exposure subscription service Nsmf/upf_EventExposure_Subscribe to the SMF/UPF.

S07b. The SMF/UPF triggers an SMF/UPF capability exposure notification service Nsmf/upf_EventExposure_Notify to the NWDAF 1.

A process in which the NWDAF 1 may obtain inference data from the SMF/UPF is the same as a method in steps S03a and S03b; in other words, is a process in which the NWDAF 1 obtains traffic data corresponding to a new IP 5-tuple from the UPF.

It should be noted that the NWDAF 1 may be co-located with the UPF. Therefore, a process in which the NWDAF 1 obtains the inference data in steps S07a and S07b is almost equivalent to a process in which the UPF obtains the inference data, and a delay is very short.

In addition, if the NWDAF 1 is not independently deployed, a function of the NWDAF 1 may be integrated into the UPF. In other words, the UPF obtains the application type identification model or the traffic characteristic from the NWDAF 2. In this way, after obtaining the inference data, the UPF may directly determine a corresponding App ID.

S08. The NWDAF 1 determines the App ID of the service data flow based on the inference data. For details, refer to descriptions in step S01. Details are not described herein again.

It can be learned from the foregoing example descriptions that the NWDAF determines, based on the historical PFD information and the traffic information on the corresponding UPF, the traffic dataset corresponding to the App ID, and may further determine the traffic characteristic of the App ID or train the application type identification model. When an IP 3-tuple changes in the future, the NWDAF may still lock, based on the traffic characteristic or the application type identification model, an App ID corresponding to a new service flow.

For example, the AF provides, by using the PFD, that only a first IP 3-tuple is a service flow that belongs to the App ID. Actually, in an actual service transmission process, the AF also transmits the service flow of the App ID by using a second IP 3-tuple, but the AF does not send the second IP 3-tuple as PFD information to the network side NEF. However, because both the first IP 3-tuple and the second IP 3-tuple correspond to a service corresponding to the App ID, traffic characteristic corresponding to service flows of the first IP 3-tuple and the second IP 3-tuple do not change, or service models corresponding to the service flows do not change. Therefore, a service traffic characteristic learned by the NWDAF by using the first IP 3-tuple may also be used for service identification of the service flow corresponding to the second IP 3-tuple. That is, even if the AF does not include the second IP 3-tuple in the PFD information, the NWDAF may still identify, by using traffic characteristic, a service corresponding to the traffic characteristic.

In this embodiment of this application, the NWDAF obtains the historical PFD information from the NEF, supervisedly learns the traffic characteristic corresponding to the App ID, and installs the traffic characteristic on the UPF or an inference module that is deployed at a same location as the UPF, to assist in fast service detection of a user plane service flow.

EMBODIMENT 2

In Embodiment 2, after long-time inference, an NWDAF 2 finds that an IP 3-tuple always corresponds to a specific App ID, but the IP 3-tuple does not appear in historical PFD information previously provided by an AF. Therefore, the IP 3-tuple may be used as a new piece of PFD information and stored in an NEF to assist another UPF in using the PFD information.

In this embodiment of this application, the NWDAF learns the new PFD information, and assists the UPF in being capable of directly obtaining the App ID by using the IP 3-tuple.

Therefore, an inference data collection delay and an inference delay (for example, a delay in determining the App ID by a classifier or a delay in matching inference data with a traffic characteristic) in step S07 in Embodiment 1 are omitted.

Figure 5:
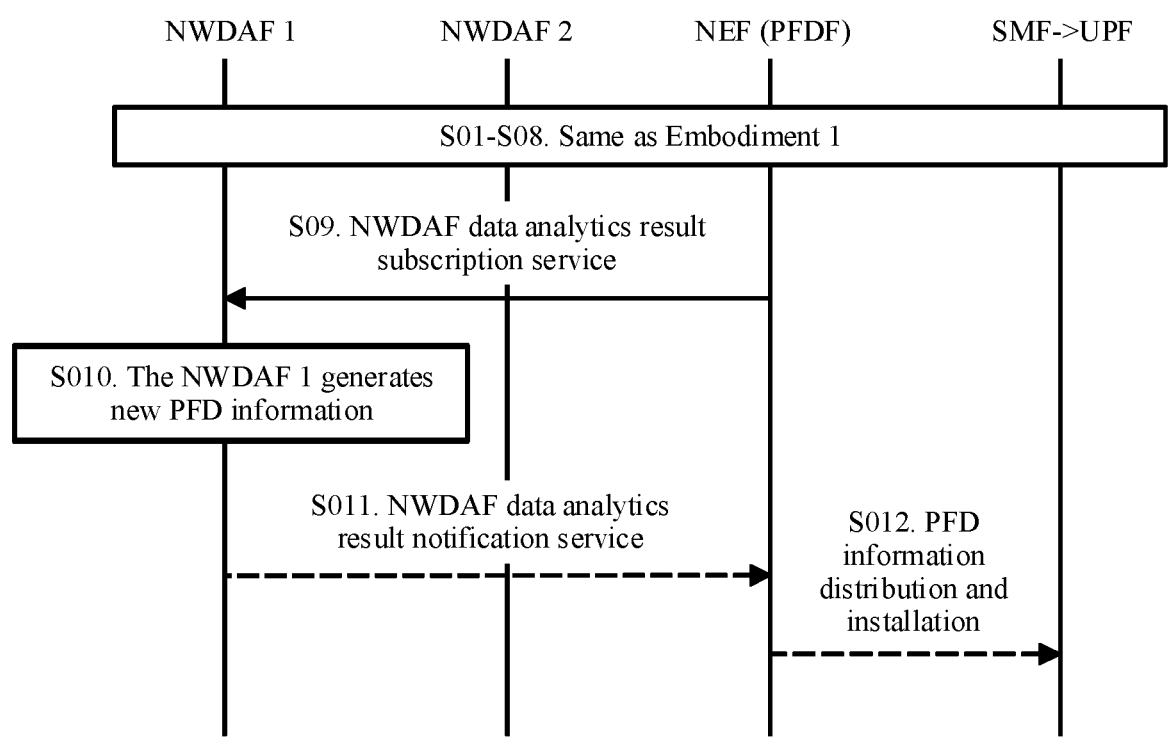
FIG. 5 is a schematic interaction diagram in another application scenario of a communication method according to an embodiment of this application.

As shown in FIG. 5, Embodiment 2 mainly includes the following procedures.

S01 to S08. Same as Embodiment 1.

S09. The NEF triggers an NWDAF data analytics result subscription service Nnwdaf_AnalyticsSubscription_Subscribe to the NWDAF 1, and may subscribe to new PFD information from the NWDAF 1. For explanations of the information in an analytics filter, refer to step S01 in Embodiment 1. Details are not described again.

S010. The NWDAF 1 generates the new PFD information. The NWDAF 1 may obtain a large quantity of historical inference results in step S08. For example, refer to Table 3. Table 3 is an inference result generated by the NWDAF based on an application type identification model or a traffic characteristic. It is assumed that a first IP 3-tuple (Server IP 1, Server Port 1, Protocol 1) already exists in historical PFD information, but a second IP 3-tuple (Server IP 2, Server Port 2, Protocol 2) and a third IP 3-tuple (Server IP 3, Server Port 3, Protocol 3) do not exist in the historical PFD information.

TABLE 3

| Traffic information | App ID | IP 3-tuple |
| --- | --- | --- |
| Traffic Data X | App ID 1 | Server IP 1, Server Port 1, Protocol 1 |
| Traffic Data X + 1 | App ID 1 | Server IP 2, Server Port 2, Protocol 2 |
| Traffic Data X + 2 | App ID 1 | Server IP 2, Server Port 2, Protocol 2 |
| Traffic Data X + 3 | App ID 1 | Server IP 3, Server Port 3, Protocol 3 |
| Traffic Data X + 4 | App ID 1 | Server IP 2, Server Port 2, Protocol 2 |
| ... | ... | ... |
| Traffic Data X + M | App ID 1 | Server IP 2, Server Port 2, Protocol 2 |

The historical PFD information of a previous App ID is as follows:
  a PFD ID: identifies PFD information of a service; and
  the first IP 3-tuple.

Then, the NWDAF 1 performs statistical analytics, and determines that a large quantity of IP 3-tuples (for example, Server IP 2, Server Port 2, Protocol 2) belonging to a same service (marked by using the App ID 1) appear, and do not exist in historical PFD information corresponding to the service. In this case, the NWDAF 1 may generate a piece of new PFD information, to be specific, an IP 3-tuple (for example, Server IP 2, Server Port 2, Protocol 2), a URL, and a Domain Name. In this case, for the App ID, updated PFD information is as follows:
  a PFD ID: identifies PFD information of the service;
  the first IP 3-tuple; and
  the second IP 3-tuple, where the second IP 3-tuple is a newly added 3-tuple.

In this embodiment of this application, in the future, if the UPF detects that an IP 3-tuple corresponding to a service flow is the second IP 3-tuple, the UPF may directly determine the App ID of the service. The IP 3-tuple is determined based on the service model or traffic characteristic.

Table 4 is an inference result generated by the NWDAF based on an application type identification model or a traffic characteristic. It is assumed that a first IP 3-tuple (Server IP 1, Server Port 1, Protocol 1) already exists in historical PFD information, but a second IP 3-tuple (Server IP 2, Server Port 2, Protocol 2) and a third IP 3-tuple (Server IP 3, Server Port 3, Protocol 3) do not exist in the historical PFD information.

TABLE 4

| Traffic information | App ID | IP 3-tuple |
| --- | --- | --- |
| Traffic Data X + 1 | App ID 1 | Server IP 2, Server Port 2, Protocol 2 |
| Traffic Data X + 2 | App ID 1 | Server IP 2, Server Port 2, Protocol 2 |
| Traffic Data X + 3 | App ID 1 | Server IP 3, Server Port 3, Protocol 3 |
| Traffic Data X + 4 | App ID 1 | Server IP 2, Server Port 2, Protocol 2 |
| ... | ... | ... |
| Traffic Data X + M | App ID 1 | Server IP 2, Server Port 2, Protocol 2 |

It can be learned from the example in Table 4 that a large quantity of second IP 3-tuples (Server IP 2, Server Port 2, Protocol 2) exist in the inference result, but the historical PFD information (to be specific, the first IP 3-tuple (Server IP 1, Server Port 1, Protocol 1)) seldom appears in the inference result. Therefore, it may be determined that the first IP 3-tuple has become invalid. In this case, the NWDAF 1 may overwrite the first IP 3-tuple with the second IP 3-tuple as new PFD information corresponding to the App ID, in other words, replace the first IP 3-tuple with the second IP 3-tuple. To be specific, for the App ID, updated PFD information is as follows:
  a PFD ID: identifies PFD information of the service; and
  the second IP 3-tuple, where the second IP 3-tuple is an updated 3-tuple.

S011. The NWDAF 1 triggers an NWDAF data analytics result notification service Nnwdaf_AnalyticsSubscription_Notify to the NEF, and the NWDAF 1 sends the newly generated PFD information to the NEF. The service operation includes the App ID and the second IP 3-tuple. Optionally, the service operation further includes first indication information or second indication information. The first indication information indicates that the second IP 3-tuple is PFD information newly added for the App ID, and the second indication information indicates to update the first IP 3-tuple in the PFD information of the App ID to the second IP 3-tuple.

Optionally, if the NWDAF 1 includes the second indication information in the service operation, the service operation further needs to include the first IP 3-tuple.

S012. The NEF distributes the newly generated PFD information to the SMF/UPF, and installs the PFD information in the SMF/UPF. In this way, the UPF receives a new service data flow, and may first extract a server IP address, a server port number, and a protocol number from an IP 5-tuple. If the server IP address, the server port number, and the protocol number satisfy a new IP 3-tuple (for example, Server IP 2, Server Port 2, Protocol 2), an App ID (for example, an App ID 1) may be directly inferred, and a model inference and characteristic matching process in step S08 is not required, so that a delay of determining the App ID is reduced.

Compared with Embodiment 1, the NWDAF 1 performs one more step of statistical analytics, to determine the new PFD information, to assist the UPF in quickly determining the App ID of the service flow. The UPF can quickly determine the App ID of the service flow based on the new PFD information generated by the NWDAF 1, so that an inference delay is reduced.

EMBODIMENT 3

In Embodiment 1 and Embodiment 2, the AF may provide PFD information of a service. In this case, the NWDAF may determine a traffic characteristic of the service or participate in training of an application type identification model by using a supervised learning method. However, if the AF does not provide the PFD information, and the NWDAF can learn, by using an unsupervised learning method, that an IP 3-tuple corresponds to a service, the NWDAF may determine an App ID of the service by using a third-party AF.

Figure 6:
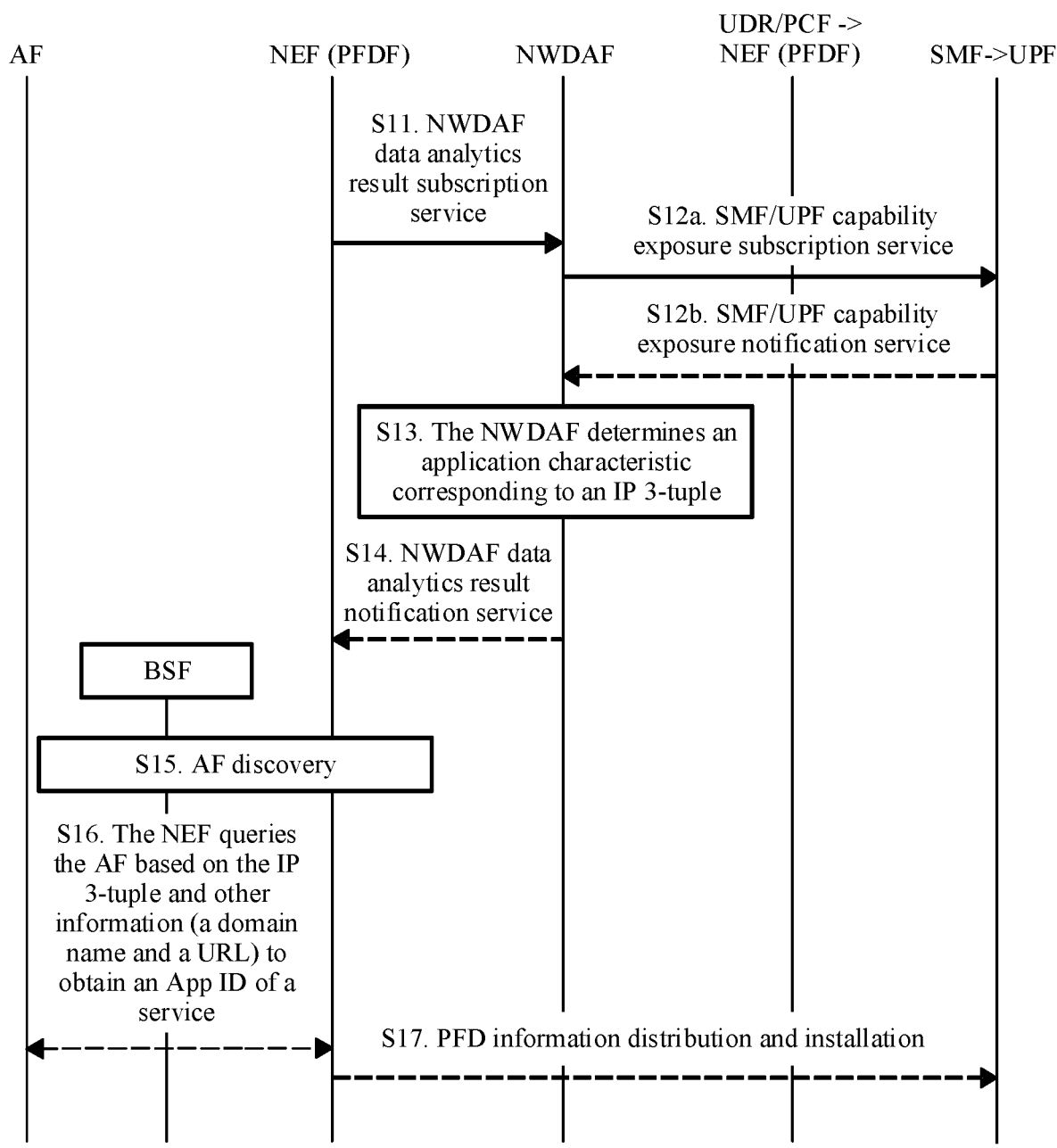
FIG. 6 is a schematic interaction diagram in another application scenario of a communication method according to an embodiment of this application.

As shown in FIG. 6, Embodiment 3 mainly includes the following procedures.

S11. An NEF triggers an NWDAF analytics result subscription service Nnwdaf_AnalyticsSubscription_Subscribe to an NWDAF, and subscribes to PFD information from the NWDAF. For explanations of information in an analytics filter, refer to step S01 in Embodiment 1. Details are not described again.

In this process, the NEF does not provide any App ID. Therefore, the NWDAF needs to analyze only data whose App ID cannot be determined in a subsequent analytics process.

S12a. The NWDAF triggers an SMF/UPF capability exposure subscription service Nsmf/upf_EventExposure_Subscribe to an SMF/UPF.

S12b. The SMF/UPF triggers an SMF/UPF capability exposure notification service Nsmf/upf_EventExposure_Notify to the NWDAF.

Compared with Embodiment 1, in a process in which the NWDAF collects traffic information from the SMF or the UPF, the NWDAF herein does not limit an App ID. Therefore, in a data collection process, the UPF only collects traffic data whose App ID cannot be determined. In other words, the NWDAF does not need to perform unsupervised learning on data whose App ID can be determined.

S13. The NWDAF determines an application characteristic corresponding to an IP 3-tuple.

For example, the NWDAF clusters a training dataset Training dataset based on an unsupervised machine learning algorithm (for example, K-means). It is assumed that N clusters are clustered. For each cluster, an IP 3-tuple that includes a largest quantity of IP 3-tuples is used as a part of candidate PFD information.

S14. The NWDAF triggers an NWDAF analytics result notification service Nnwdaf_AnalyticsSubscription_Notify to the NEF, and sends N IP 3-tuples, domain names, and URLs obtained through analytics to the NEF (a PFDF).

In this step, the NWDAF can only determine that an IP 3-tuple corresponds to a specific service, but cannot determine an App ID corresponding to the IP 3-tuple.

In addition, the NWDAF extracts, in step S14, UE IP addresses corresponding to some IP 3-tuples from the training dataset in step S13, and sends the UE IP addresses to the NEF, to assist the NEF in obtaining, from a binding support function (BSF) network element based on the UE IP addresses, an address of an AF that provides the service.

The BSF supports registration, update, and deregistration of user binding information. A PCF may perform insertion, update, or deletion on the user binding information (a PCF address, a user identifier SUPI, and a user IP address) in the BSF. The NEF/AF may query, through a service-based interface and the user IP address, the BSF for the PCF address that serves a user.

S15. The NEF discovers the AF through the BSF. The NEF may obtain, from the BSF by using one or more UE IP addresses corresponding to an IP 3-tuple in step S14, an AF address bound to the UE IP address, so as to find an AF serving a service corresponding to the IP 3-tuple.

S16. The NEF queries the AF based on the IP 3-tuple and other information (a domain name and a URL) to obtain an App ID of the service. In this way, the NEF determines complete PFD information.

S17. The NEF distributes the newly generated PFD information to the SMF/UPF, and installs the PFD information. In this embodiment, the AF provides the App ID corresponding to the IP 3-tuple. A specific method of obtaining the IP 3-tuple is learned by the NWDAF.

Compared with Embodiment 1 and Embodiment 2, in this embodiment of this application, the NWDAF performs unsupervised learning on traffic that does not have historical PFD information, to obtain that an IP 3-tuple may correspond to a service, and then negotiates with a third-party AF to determine a specific App ID. The NWDAF determines, by using an unsupervised learning method, that the IP 3-tuple corresponds to the service. After the IP 3-tuple is sent to the NEF, the NEF may query the third-party AF to determine the App ID corresponding to the IP 3-tuple, and then obtain complete PFD information, to assist in user plane service detection.

It can be learned from the foregoing example descriptions that this embodiment of this application proposes a data analytics-based service identification solution, so that the NWDAF can construct, based on a historical App ID and corresponding traffic data that are provided by the PFDF, a service classifier or a traffic characteristic corresponding to the App ID, to assist the SMF/UPF in identifying an App ID corresponding to new traffic data. If there is no historical PFD information, the NWDAF can also determine, by using the unsupervised method, that an IP 3-tuple corresponds to a special service. Then, the NWDAF can query the third-party AF to determine an App ID, so as to form new PFD information, and push the new PFD information for user plane service detection.

EMBODIMENT 4

A training function module (for example, an NWDAF 2) of an NWDAF trains an application status identification model based on a historical application status (a foreground state or a background state) and historical traffic information that correspond to an application, and then installs the application status identification model on an inference function module (an NWDAF 1) of the NWDAF. In an inference process, traffic data corresponding to a real-time service flow is input into the application status identification model, so that an application status of the service flow may be determined.

Figure 7:
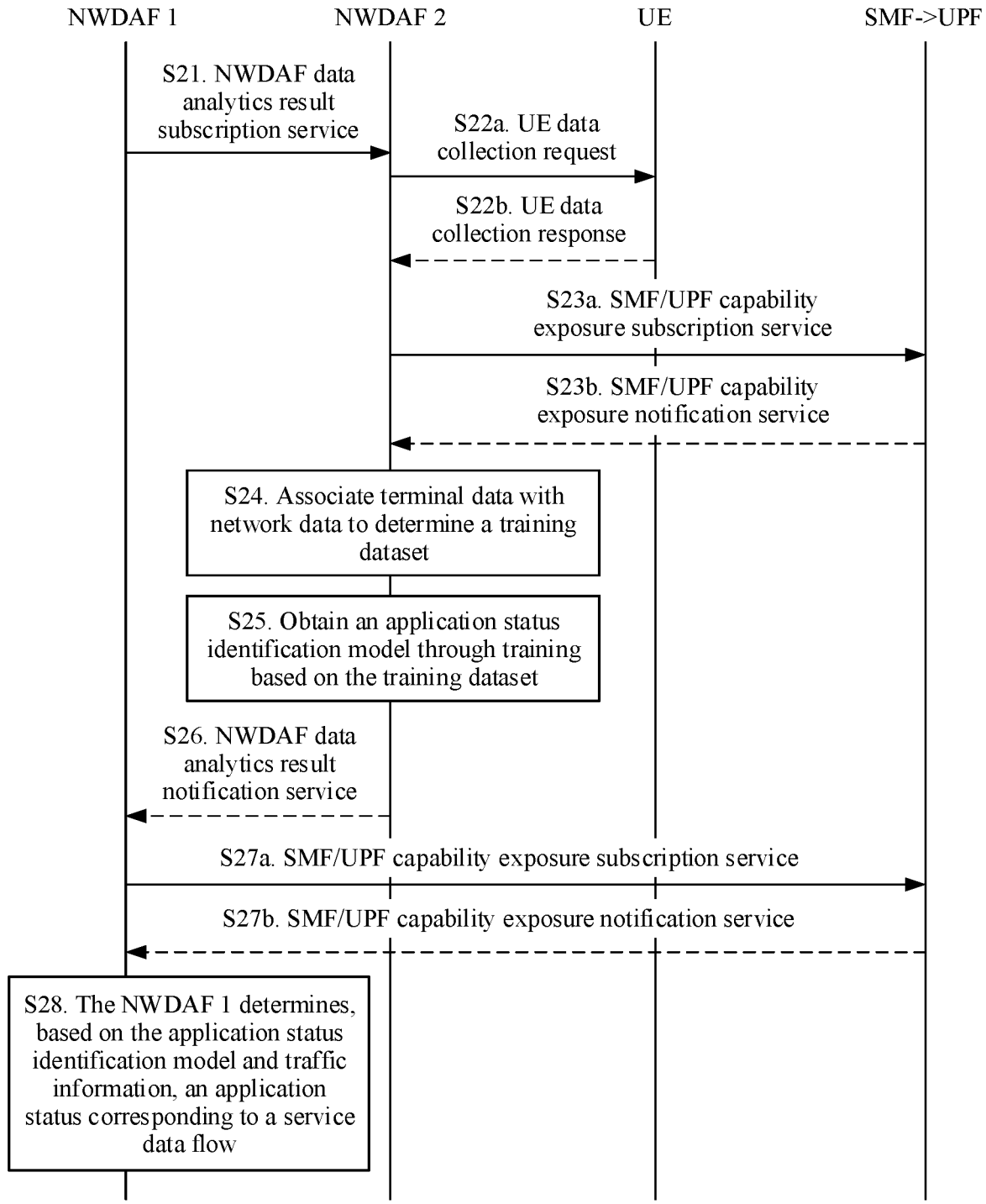
FIG. 7 is a schematic interaction diagram in another application scenario of a communication method according to an embodiment of this application.

FIG. 7 mainly includes the following procedures.

S21. The NWDAF 1 triggers an NWDAF data analytics result subscription service Nnwdaf_AnalyticsSubscription_Subscribe to the NWDAF 2, to request an application status identification model. Both the NWDAF 1 and the NWDAF 2 may be used to determine an application status corresponding to a service data flow. The NWDAF 1 is an NWDAF that supports an inference function, and the NWDAF 2 is an NWDAF that supports a training function. The service operation includes the following information:

an analytics identifier (Analytics ID, for example, an application status identification model Application Status Identification Model); and an analytics filter Analytics Filter may include a plurality of types of filtering information. For example, the analytics filter may be an application identifier App ID, a slice identifier S-NSSAI, a data network name DNN, and a network area Network Area. The filtering information may be used together, for example, limited to a service in a slice.

The NWDAF 1 may specify that an application status identification model is trained for a service corresponding to an App ID, or a traffic characteristic of a service is extracted for a service corresponding to each of the App IDs.

For example, the NWDAF 1 may collect traffic information corresponding to the service (refer to Table 5 below), so that the NWDAF 1 can obtain training data.

TABLE 5

| Data | Data source | Descriptions |
|---|---|---|
| Application status | UE | Application status: Foreground state or background state |
| Application identifier | UE | Identifies an application. |
| Terminal identifier SUPI | SMF/UPF/UE | Terminal identifier |
| IP 5-tuple | SMF/UPF/UE | IP 5-tuple |
| Slice identifier S-NSSAI | SMF/UPF | Slice |
| Data network name DNN | SMF/UPF | DNN |
| Start time point and end time point of data packet transmission Start/end time | SMF/UPF | Start/End time point |
| Data volume Data volume | SMF/UPF | Traffic volume (uplink (UL)/downlink (DL)) |
| Data duration Data duration | SMF/UPF | Traffic duration (UL/DL) |
| QoS flow bit rate QoS flow Bit Rate | SMF/UPF | Observation bandwidth (UL/DL) |
| Quantity of transmitted packets Packet transmission | SMF/UPF | Quantity of observation packets (per UL/DL) |
| Data packets Payload packets | SMF/UPF | User-plane data packet collection |

After the NWDAF 1 obtains the training data shown in Table 5, the NWDAF 1 may train an application status identification model based on the training data. The application status identification model may perform service status classification on traffic information corresponding to a new service flow, and a service status may be classified into a foreground state and a background state.

The S-NSSAI is a slice identifier of a network slice, and the NWDAF 1 may specify that a service status identification model is trained for all services in the slice.

The DNN is a data network name, and the NWDAF 1 may specify that a service status identification model is trained for all services in a data network corresponding to the DNN.

An area of interest is information about an area. The NWDAF 1 may specify that a service status identification model is trained for all service in the area.

S22a. The NWDAF 2 requests information about an application status on the UE from the UE, where the request may include one or more of the following information: identification information, time information, and area information of an application.

S22b. The UE reports the information about the application status to the NWDAF 2, where the information about the application status includes IP 5-tuple information and an application status (a foreground state or a background state). Optionally, the UE further reports an application identifier corresponding to the IP 5-tuple information.

S23a. The NWDAF 2 triggers an SMF/UPF capability exposure subscription service Nsmf/upf_EventExposure_Subscribe to the SMF/UPF.

S23b. The SMF/UPF triggers an SMF/UPF capability exposure notification service Nsmf/upf_EventExposure_Notify to the NWDAF 2.

A process in which the NWDAF 2 subscribes to the traffic information from the SMF/UPF is the same as that in Embodiment 1, and details are not described again.

S24 is a process in which the NWDAF 2 generates a training dataset, where a format of the training dataset is shown in Table 6, and Table 6 is used to train an application status identification model, and there are a total of N pieces of sample data. In a specific process, for one piece of traffic information from the UPF, the NWDAF 2 first extracts a server IP address, a server port number, and a protocol number from an IP 5-tuple of the traffic information, and then queries, from historical PFD information, an App ID corresponding to the server IP address, the server port number, and the protocol number, so that a piece of sample data can be determined in this data association manner.

TABLE 6

| Traffic information | App Status |
|---|---|
| Traffic Data 1 | Background |
| Traffic Data 2 | Foreground |
| Traffic Data 3 | Background |
| Traffic Data 4 | Foreground |
| Traffic Data 5 | Foreground |
| ... | ... |
| Traffic Data N | Background |

S25. The NWDAF determines an application status identification model corresponding to a service.

Based on the training dataset, the NWDAF 2 may train an application status identification model that identifies a service status.

Specifically, a process of training the application status identification model by the NWDAF 2 is training a classifier by using a supervised machine learning algorithm, for example, logistic regression or a support vector machine. Using logistic regression as an example, the classifier (for example, a binary classifier for an App ID 1 and a non-App ID 1) may be represented as follows:

$$y_i = \begin{cases} 0, z_i < 0 \\ 1, z_i \geq 0 \end{cases}$$

$$z_i = w_0 \times x_{i0} + w_1 \times x_{i1} + w_2 \times x_{i2} + w_3 \times x_{i3} + \ldots + w_D \times x_{iD}.$$

In the foregoing formula:
- $y_i$ is a service status result of traffic data of an $i^{th}$ service data flow, if $y_i=1$, a service status is the foreground state; or if $y_i=0$, a service status is the background state;
- $z_i$ is an intermediate data value obtained by performing linear regression on $x_i$;
- $x_i = \{x_{i0}, x_{i1}, x_{i2}, x_{i3}, \ldots, x_{iD}\}$ is a vector converted from the traffic data of the $i^{th}$ service data flow, where $x_{i0}, x_{i1}, x_{i2}, x_{i3}, \ldots, X_{iD}$ is traffic data of service data flows, for example, a start time point of communication or interaction, an uplink or downlink packet delay, and a quantity of uplink or downlink packets; for details, refer to the foregoing Table 1; and
- $w = \{w_0, w_1, w_2, w_3, \ldots, w_D\}$ is a weight.

S26. The NWDAF 2 triggers an NWDAF analytics result notification service Nnwdaf_AnalyticsSubscription_Notify to the NWDAF 1, and the NWDAF 2 sends the application status identification model to the NWDAF 1.

S27a. The NWDAF 1 triggers an SMF/UPF capability exposure subscription service Nsmf/upf_EventExposure_Subscribe to the SMF/UPF.

S27b. The SMF/UPF triggers an SMF/UPF capability exposure notification service Nsmf/upf_EventExposure_Notify to the NWDAF 1.

A process in which the NWDAF 1 obtains inference data from the SMF/UPF is the same as a method in steps S23a and S23b; in other words, is a process in which the NWDAF 1 obtains traffic data corresponding to a new IP 5-tuple from the UPF.

It should be noted that the NWDAF 1 may be co-located with the UPF. Therefore, a process in which the NWDAF 1 obtains the inference data in steps S27a and S27b is almost equivalent to a process in which the UPF obtains the inference data, and a delay is very short.

In addition, if the NWDAF 1 is not independently deployed, a function of the NWDAF 1 may be integrated into the UPF. In other words, the UPF obtains the application status identification model from the NWDAF 2. In this way, after obtaining the inference data, the UPF may directly determine a corresponding application status.

S28 is a process in which the NWDAF 1 determines the application status of the service data flow based on the inference data. For details, refer to descriptions in step S21. Details are not described herein again.

In this embodiment of this application, the NWDAF obtains historical application status information from the UE, supervisedly learns a traffic characteristic corresponding to the application status, and installs the traffic characteristic on the UPF or an inference module that is deployed at a same location as the UPF, to assist in fast application status detection of a user plane service flow.

It should be noted that, for brief description, the foregoing method embodiments are represented as a series of actions. However, a person skilled in the art should appreciate that this application is not limited to the described order of the actions, because according to this application, some steps may be performed in other orders or simultaneously. A person skilled in the art should further appreciate that embodiments described in this specification all belong to embodiments, and the related actions and modules are not necessarily required for this application.

To better implement the foregoing solutions in embodiments of this application, the following further provides related apparatuses for implementing the foregoing solutions.

Figure 8:
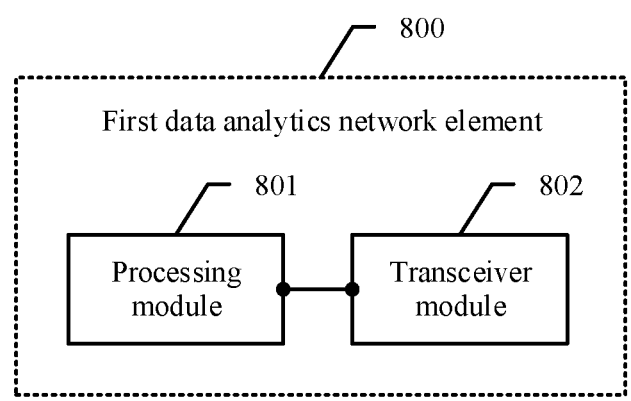
FIG. 8 is a schematic diagram of a structure of a first data analytics network element according to an embodiment of this application.

Refer to FIG. 8. A first data analytics network element 800 according to an embodiment of this application may include a processing module 801 and a transceiver module 802.

The processing module is configured to receive first information of an application from a first network element through the transceiver module, where the first information includes first application description information and/or an application status that correspond/corresponds to the application, the first application description information includes an application identifier and first internet protocol IP information that correspond to the application, and the application status includes a foreground state or a background state of the application.

The processing module is configured to determine second information based on the first information, where the second information includes the application identifier and at least one of the following: an application analytics model, at least one application characteristic, and second application description information.

The processing module is configured to send the second information to a second network element through the transceiver module, where the second information is used by the second network element to identify application information corresponding to first data, and the application information corresponding to the first data includes an application identifier and/or an application status of the first data.

The processing module 801 is configured to perform a data processing operation of the first data analytics network element in the foregoing method embodiments. The transceiver module 802 is configured to perform data receiving and sending operations of the first data analytics network element in the foregoing method embodiments. Specifically, the transceiver module 802 may specifically include a receiving module and a sending module.

Figure 9:
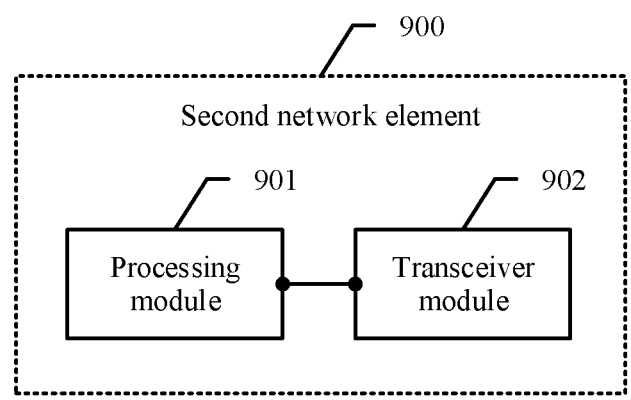
FIG. 9 is a schematic diagram of a structure of a second network element according to an embodiment of this application.

Refer to FIG. 9. A second network element 900 according to an embodiment of this application may include a processing module 901 and a transceiver module 902.

The processing module is configured to receive second information from a first data analytics network element through a transceiver module, where the second information includes an application identifier of an application and at least one of the following: an application analytics model, at least one application characteristic, and second application description information.

The processing module is configured to determine, based on the second information, application information corresponding to first data, where the application information corresponding to first data includes an application identifier and/or an application status of the first data, and the application status includes a foreground state or a background state of the application.

The processing module 901 is configured to perform a data processing operation of the second network element in the foregoing method embodiments. The transceiver module 902 is configured to perform data receiving and sending operations of the second network element in the foregoing method embodiments. Specifically, the transceiver module 902 may specifically include a receiving module and a sending module.

It should be noted that content, such as information exchange between the modules/units of the apparatus and the execution processes thereof, is based on the same idea as the method embodiments of this application, and produces the same technical effects as the method embodiments of this application. For specific content, refer to the foregoing descriptions in the method embodiments of this application. Details are not described herein again.

An embodiment of this application further provides a computer storage medium. The computer storage medium stores a program, and the program performs a part or all of the steps described in the foregoing method embodiments.

Figure 10:
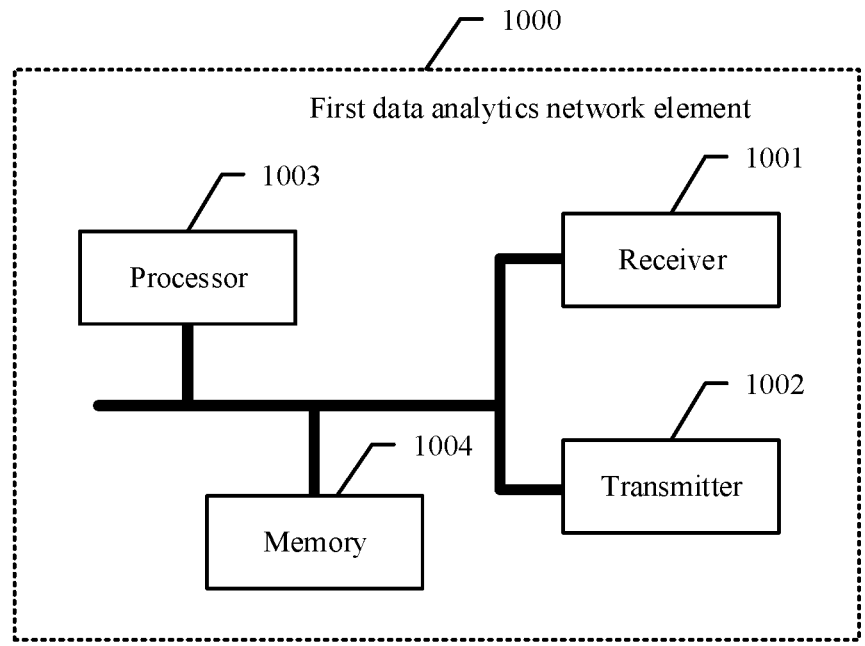
FIG. 10 is a schematic diagram of a structure of a first data analytics network element according to an embodiment of this application.

The following describes another first data analytics network element according to an embodiment of this application. Refer to FIG. 10. The first data analytics network element 1000 includes:

a receiver 1001, a transmitter 1002, a processor 1003, and a memory 1004 (where there may be one or more processors 1003 in the first data analytics network element 1000, and an example in which there is one processor is used in FIG. 10). In some embodiments of this application, the receiver 1001, the transmitter 1002, the processor 1003, and the memory 1004 may be connected through a bus or in another manner. In FIG. 10, a connection through the bus is used as an example. In a possible implementation, the receiver 1001 and the transmitter 1002 may be specifically a communication interface, an interface circuit, or a transceiver module 802, and are used by the first data analytics network element to exchange information with an external network element.

The memory 1004 may include a read-only memory and a random access memory, and provide instructions and data for the processor 1003. A part of the memory 1004 may further include a non-volatile random access memory (NVRAM). The memory 1004 stores an operating system and operation instructions, an executable module or a data structure, or a subset thereof or an extended set thereof. The operation instructions may include various operation instructions for implementing various operations. The operating system may include various system programs, to implement various basic services and process a hardware-based task.

The processor 1003 controls operations of the first data analytics network element, and the processor 1003 may also be referred to as a central processing unit (CPU). In a specific application, components of the data analytics network element are coupled together through a bus system. In addition to a data bus, the bus system further includes a power bus, a control bus, a state signal bus, and the like. However, for clear description, various types of buses in the figure are marked as the bus system.

The method disclosed in embodiments of this application may be applied to the processor 1003, or may be implemented by the processor 1003. The processor 1003 may be an integrated circuit chip, and have a signal processing capability. In an implementation process, the steps in the methods can be implemented by using a hardware integrated logical circuit in the processor 1003, or by using instructions in a form of software. The processor 1003 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The foregoing processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1004, and the processor 1003 reads information in the memory 1004 and completes the steps in the foregoing methods in combination with hardware of the processor 1003.

The receiver 1001 may be configured to receive input digits or character information, and generate signal input that is related to related setting and function control of the first data analytics network element. The transmitter 1002 may include a display device such as a display screen. The transmitter 1002 may be configured to output the digits or the character information through an external interface.

In this embodiment of this application, the processor 1003 is configured to perform the communication method performed by the first data analytics network element.

The processor 1003 may be the foregoing processing module 801.

Figure 11:
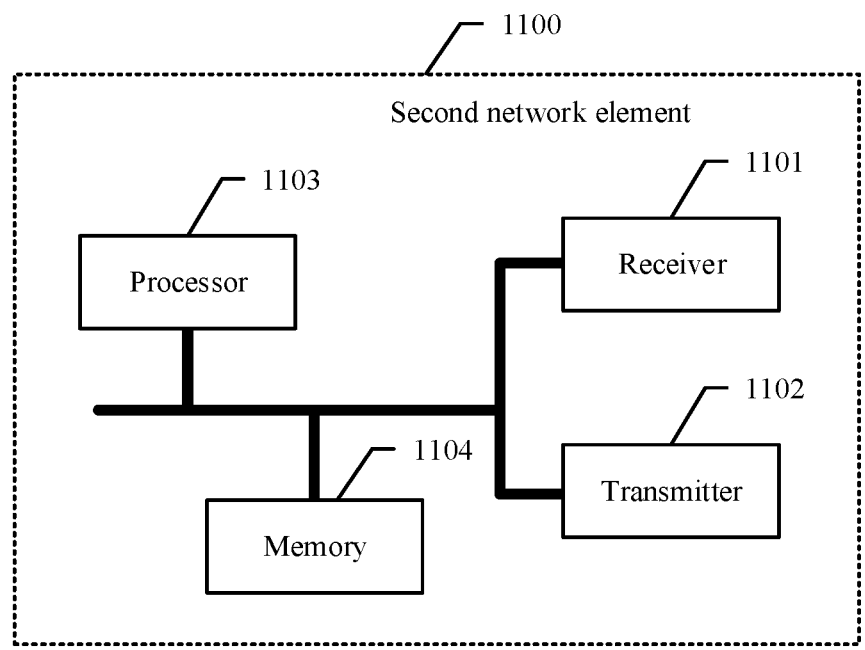
FIG. 11 is a schematic diagram of a structure of a second network element according to an embodiment of this application.

The following describes another second network element according to an embodiment of this application. Refer to FIG. 11. The second network element 1100 includes:

a receiver 1101, a transmitter 1102, a processor 1103, and a memory 1104 (where there may be one or more processors 1103 in the second network element 1100, and an example in which there is one processor is used in FIG. 11). In some embodiments of this application, the receiver 1101, the transmitter 1102, the processor 1103, and the memory 1104 may be connected through a bus or in another manner. In FIG. 11, a connection through the bus is used as an example.

The memory 1104 may include a read-only memory and a random access memory, and provide instructions and data for the processor 1103. A part of the memory 1104 may further include an NVRAM. The memory 1104 stores an operating system and operation instructions, an executable module or a data structure, or a subset or an extended set thereof. The operation instructions may include various operation instructions for implementing various operations. The operating system may include various system programs, to implement various basic services and process a hardware-based task.

The processor 1103 controls an operation of the second network element. The processor 1103 may also be referred to as a CPU. In a specific application, components of the second network element are coupled together through a bus system. In addition to a data bus, the bus system further includes a power bus, a control bus, a state signal bus, and the like. However, for clear description, various types of buses in the figure are marked as the bus system.

The method disclosed in embodiments of this application may be applied to the processor 1103, or may be implemented by the processor 1103. The processor 1103 may be an integrated circuit chip and have a signal processing capability. In an implementation process, the steps in the methods can be implemented by using a hardware integrated logical circuit in the processor 1103, or by using instructions in a form of software. The processor 1103 may be a general purpose processor, a DSP, an ASIC, an FPGA or another programmable logic device, a discrete gate or transistor logic device, or a discrete hardware component. The foregoing processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1104, and the processor 1103 reads information in the memory 1104 and completes the steps in the foregoing methods in combination with hardware of the processor.

In this embodiment of this application, the processor 1103 is configured to perform the communication method performed by the second network element.

The processor 1103 may be the foregoing processing module 901.

In a possible implementation, the receiver 1101 and the transmitter 1102 may be specifically a communication interface, an interface circuit, or a transceiver module 902, and are used by the second network element to exchange information with an external network element.

In another possible design, when the first data analytics network element or the second network element is a chip, the chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in the first data analytics network element performs the communication method according to any one of the first aspect or the implementations of the first aspect, and the chip in the second network element performs the communication method according to any one of the second aspect or the implementations of the second aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that can store static information and instructions, or a random access memory (RAM).

The processor mentioned anywhere above may be a general-purpose central processing unit, a microprocessor, an ASIC, or one or more integrated circuits configured to control program execution of the methods.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of embodiments. In addition, in the accompanying drawings of the apparatus embodiments provided by this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by using software, hardware, firmware, or any combination thereof. When software is used to implement embodiments, all or a part of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The invention claimed is:

1. A communication system, comprising:
a first data analytics network element configured to:
receive first information of an application from a first network element, wherein the first information comprises first application description information that corresponds to the application, and the first application description information comprises an application identifier and first internet protocol (IP) information that correspond to the application;
receive second data corresponding to the application from a third network element;
determine second information based on the first information and the second data, wherein the second information comprises the application identifier and at least one of the following corresponding to the application: an application analytics model, at least one application characteristic, or second application description information; and
send the second information; and
a second network element configured to:
receive the second information; and
determine, based on the second information, application information corresponding to first data, wherein the application information corresponding to the first data comprises an application identifier of the first data.

2. The system according to claim 1, wherein the second information comprises the application analytics model; and
wherein determining the second information based on the first information and the second data comprises performing model training based on the first information and the second data to obtain the application analytics model.

3. The system according to claim 1, wherein the second information comprises the at least one application characteristic; and
wherein determining the second information based on the first information and the second data comprises performing application characteristic extraction on the second data based on the first information to obtain the at least one application characteristic.

4. The system according to claim 1, wherein the second information comprises the second application description information, and the second application description information comprises second IP information; and
wherein determining the second information based on the first information and the second data comprises:
determining the application analytics model or the at least one application characteristic based on the first information and the second data; and
determining the second application description information based on the application analytics model or the at least one application characteristic.

5. The system according to claim 4, wherein the first data analytics network element is further configured to:
determine that the first IP information of the application is updated to the second IP information; and
send first indication information to the second network element, wherein the first indication information indicates that the second IP information is updated IP information of the first IP information.

6. The system according to claim 4, wherein the first data analytics network element is further configured to:
determine that the second IP information is newly added IP information of the application; and
send second indication information to the second network element, wherein the second indication information indicates that the second IP information is the newly added IP information of the application.

7. The system according to claim 1, wherein:
the first data analytics network element comprises a network data analytics function (NWDAF) network element;
the first network element comprises a first network exposure function (NEF) network element; and
the second network element comprises at least one of a first user plane function (UPF) network element, a second data analytics network element, or a second NEF network element.

8. The system according to claim 1, wherein the third network element comprises a second UPF network element, a session management function (SMF) network element, an access and mobility management function (AMF) network element, and an application function (AF) network element.

9. The system according to claim 1, wherein the second network element is further configured to:
obtain a first characteristic parameter from the first data;
input the first characteristic parameter into the application analytics model; and
output the application information corresponding to the first data through the application analytics model.

10. The system according to claim 1, wherein the second information comprises the at least one application characteristic, and the at least one application characteristic corresponds to the application information; and
wherein determining, based on the second information, the application information corresponding to first data comprises:
obtaining a second characteristic parameter from the first data; and
matching the second characteristic parameter with the at least one application characteristic, wherein if the second characteristic parameter successfully matches the at least one application characteristic, the application information corresponding to the at least one application characteristic is the application information corresponding to the first data.

11. The system according to claim 1, wherein the second information comprises the second application description information, and the second application description information comprises second IP information; and
wherein determining, based on the second information, the application information corresponding to first data comprises:
determining IP information of the first data; and
determining, based on the IP information of the first data and the second IP information corresponding to the application, the application information corresponding to the first data.

12. The system according to claim 1, wherein before receiving the second information, the second network element is further configured to:
when the second network element comprises a second data analytics network element, generate filtering information based on a preset data analytics filtering condition, and send the filtering information to the first data analytics network element, wherein the filtering information requests the second information;
when the second network element comprises a first user plane function (UPF) network element, filter the second data based on a preset event filtering condition, and send the filtered second data to the first data analytics network element, wherein the filtered second data is used by the first data analytics network element to determine the second information; or
when the second network element comprises a second network exposure function (NEF) network element, send first application description information to the first data analytics network element, wherein the first application description information comprises the application identifier and first IP information that correspond to the application, and the first application description information is used by the first data analytics network element to determine the second information.

13. The system according to claim 1, wherein the second network element comprises a second network exposure function (NEF) network element, and the second network element is further configured to:
receive first indication information from the first data analytics network element; and
determine, based on the first indication information, that second IP information comprised in the second application description information is updated IP information of the first IP information.

14. The system according to claim 1, wherein the second network element comprises a second network exposure function (NEF) network element, and the second network element is further configured to:
receive second indication information from the first data analytics network element; and
determine, based on the second indication information, that second IP information comprised in the second application description information is newly added IP information of the application.

15. The system according to claim 1, wherein the application information corresponding to the first data comprises the application identifier of the first data, and the second network element is further configured to:
obtain policy information of the first data based on the application identifier of the first data.

16. A communication apparatus, comprising:
at least one processor; and
a memory coupled to the at least one processor and storing programming instructions for execution by the at least one processor to perform operations comprising:

receiving second information from a first data analytics network element, wherein the second information comprises an application identifier of an application and at least one of the following corresponding to the application: an application analytics model, at least one application characteristic, or second application description information; and determining, based on the second information, application information corresponding to first data, wherein the application information corresponding to the first data comprises at least one of an application identifier or an application status of the first data, and the application status comprises a foreground state or a background state of the application.

17. The communication apparatus according to claim 16, wherein determining, based on the second information, the application information corresponding to the first data comprises:

obtaining a first characteristic parameter from the first data;

inputting the first characteristic parameter into the application analytics model; and outputting the application information corresponding to the first data through the application analytics model.

18. The communication apparatus according to claim 16, wherein the second network element comprises at least one of a first user plane function (UPF) network element, a second data analytics network element, or a second network exposure function (NEF) network element.

19. A communication method, comprising:

receiving second information from a first data analytics network element, wherein the second information comprises an application identifier of an application and at least one of the following corresponding to the application: an application analytics model, at least one application characteristic, or second application description information; and determining, based on the second information, application information corresponding to first data, wherein the application information corresponding to the first data comprises at least one of an application identifier or an application status of the first data, and the application status comprises a foreground state or a background state of the application.

20. The communication method according to claim 19, wherein determining, based on the second information, the application information corresponding to the first data comprises:

obtaining a first characteristic parameter from the first data;

inputting the first characteristic parameter into the application analytics model; and outputting the application information corresponding to the first data through the application analytics model.

* * * * *